United States Patent
Neuhauser et al.

(10) Patent No.: US 7,891,376 B2
(45) Date of Patent: Feb. 22, 2011

(54) DOUBLE SEAT VALVE FOR SEPARATING MEDIA

(75) Inventors: Frank Neuhauser, Neresheim (DE); Stephan Franz, Noerdlingen (DE); Wolfgang Neumeyer, Riesbuerg (DE); Stephan Thomaschki, Noerdlingen (DE)

(73) Assignee: Südmo Holding GmbH (DE)

( * ) Notice: Subject to any disclaimer, the term of this patent is extended or adjusted under 35 U.S.C. 154(b) by 317 days.

(21) Appl. No.: 12/184,725

(22) Filed: Aug. 1, 2008

(65) Prior Publication Data

US 2009/0065077 A1 Mar. 12, 2009

(30) Foreign Application Priority Data

Aug. 3, 2007 (DE) ........................ 10 2007 038 124

(51) Int. Cl.
*F16K 1/44* (2006.01)
(52) U.S. Cl. .................................. 137/614.18; 137/312
(58) Field of Classification Search ............ 137/614.17, 137/614.18, 312, 240
See application file for complete search history.

(56) References Cited

U.S. PATENT DOCUMENTS

| | | | | |
|---|---|---|---|---|
| 6,009,896 | A * | 1/2000 | Van Oosten | 137/240 |
| 6,098,645 | A * | 8/2000 | Brackelmann et al. | 137/614.17 |
| 6,186,163 | B1 * | 2/2001 | Borg | 137/312 |
| 7,530,368 | B2 * | 5/2009 | Deger | 137/614.18 |
| 2007/0151611 | A1 | 7/2007 | Deger | |

FOREIGN PATENT DOCUMENTS

| | | |
|---|---|---|
| CA | 2571244 A1 | 5/2007 |
| DE | 19608792 A1 | 9/1997 |
| DE | 102005057103 A1 | 5/2007 |
| EP | 0174384 A1 | 3/1986 |
| JP | 57154564 A | 9/1982 |
| WO | 9854494 A1 | 12/1998 |
| WO | 2007054131 A1 | 5/2007 |

OTHER PUBLICATIONS

International Search Report, Jul. 5, 2006 (2).

* cited by examiner

*Primary Examiner*—Kevin L Lee
(74) *Attorney, Agent, or Firm*—St. Onge Steward Johnston & Reens LLC

(57) ABSTRACT

A double seat valve includes a flow barrier element arranged between first and second closing elements. The flow barrier element shadows a first sealing element and/or a first closing element seat of the first closing element which is in a closed position, when the second closing element is lifted and when a cleaning medium is applied to a leakage space, the flow barrier element preventing the cleaning medium from flowing directly against the first sealing element and/or the first closing element seat. The flow barrier element also shadows a second sealing element and/or a second closing element seat of the second closing element which is in a closed position, when the first closing element is lifted and when a cleaning medium is applied to the leakage space, the flow barrier element preventing the cleaning medium from flowing directly against the second sealing element and/or the second closing element seat.

20 Claims, 18 Drawing Sheets

DOUBLE SEAT VALVE FOR SEPARATING MEDIA

CROSS-REFERENCE TO RELATED APPLICATIONS

The present application claims priority of German patent application No. 10 2007 038 124.9 filed on Aug. 3, 2007.

FIELD OF THE INVENTION

The invention generally relates to double seat valves for separating media.

BACKGROUND OF THE INVENTION

The invention specifically relates to a double seat valve of the type, comprising a valve housing which has connectors for a first pipeline and a second pipeline, further comprising a first closing element and a first closing element seat which is assigned to the latter, wherein the first closing element is in seal-forming abutment, in its closed position, with the first closing element seat via at least one sealing element, and a second closing element which is spaced apart axially from the first closing element and a second closing element seat which is assigned to said second closing element, wherein the second closing element is, in its closed position, in seal-forming abutment with the second closing element seat via at least one sealing element, wherein the two closing elements can be independently of one another from their respective closing element seat, and wherein a leakage space is provided between the two closing elements.

Such a double seat valve is known from DE 10 2005 057 103 A1.

Double seat valves of the type specified above are used, for example, in the foodstuff industry for manufacturing products such as UHT-milk, yoghurt and the like.

In such double seat valves, stringent requirements are made of the reliable separation of the media which are conducted through the at least two pipelines. In their closed position, the two closing elements separate the two connectors on the inside of the housing in a sealed fashion in relation to one another, and in the common open position of the two closing elements the pipelines which are connected to the two connectors can communicate with one another via the interior of the housing.

A further significant requirement which is made of such double seat valves is that the closing elements, including their closing element seats and the leakage space which is located at least partially between the closing elements, can be thoroughly cleaned.

So that it is not necessary to switch off all the processes in a processing system in which such a double seat valve is used in order to clean the closing elements and the leakage space, which would reduce the productivity of such a processing system, it is desirable if the cleaning process is carried out, for example, by means of one of the two pipelines, while a product process continues to run in the other pipeline. For this purpose, the two closing elements can be lifted from their closing element seat independently of one another. "Lifting" is to be understood in such double seat valves as meaning that one of the two closing elements is moved from its closing element seat by a small stroke to such an extent that there is no longer a seal-forming abutment between the sealing element of this closing element and the associated closing element seat. In this context, the other closing element continues to be in abutment with its closing element seat in a seal-forming fashion. Through the pipeline and the connector which have the closing element which is lifted assigned to them it is then possible to introduce a cleaning medium, usually a cleaning fluid, between the closing element and the associated valve seat and into the leakage space so that the cleaning medium thoroughly flushes the closing element seat of the closing element which is lifted, and its sealing element and the leakage space.

The cleaning medium then runs outwards via the leakage space into the surroundings of the double seat valve.

The previously mentioned document DE 10 2005 057 103 A1 describes the problem that when the cleaning medium is introduced in accordance with the requirements of more recent standards an additional overpressure must not be formed in the leakage space, which overpressure could lead to the other closing element which is in the closed position being moved away from its closing element seat, with the result that cleaning medium could pass into the other pipeline in which a product process is currently running. In order to overcome this problem, said document proposes providing one of the closing elements with an obliquely positioned drainage section whose overall passage cross section is at least approximately as large as the opening cross section of the larger of the two connectors. This avoids the problem of the build up of overpressure in the leakage space as a result of an excessively small discharge of cleaning medium from the leakage space during cleaning.

However, this only solves the problem of avoiding an overpressure in the leakage space. A further requirement of more recent standards is that when the leakage space is acted on after one of the two closing elements has been lifted, there is no direct flow of cleaning medium against the at least one sealing element or the closing element seat of the other closing element which is in its closed position, because cleaning medium could then get into the other pipeline. The known double seat valve mentioned above does not meet this requirement. If, for example, the lower closing element of the known double seat valve is lifted and if cleaning medium under pressure is introduced into the gap between the closing element and its closing element seat and into the leakage space, the cleaning medium firstly impinges, owing to its essentially axial direction of flow at a high flow rate, on the closing element seat and the sealing element of the upper closing element which is in the closed position, as a result of which, owing to the impact pressure building up, cleaning medium can pass the sealing element of the upper closing element and penetrate the valve housing region through which a product medium is currently flowing.

In a double seat valve which is known from WO 2007/054 131 A1, the problem specified above is intended to be solved by virtue of the fact that, on the one hand, the closing element seat of one of the closing elements has a larger diameter than the closing element seat of the other closing element, with the result that the two closing element seats are offset radially from one another in a stepped fashion. Furthermore, one of the closing elements is provided, on a side facing the other closing element, with a flow-deflecting, concavely curved recess, by which the cleaning medium which penetrates the leakage space axially is deflected radially inward, with the result that the pressurized cleaning medium cannot be applied to the sealing element of the closing element which is in the closed position.

A disadvantage of this known double seat valve is, on the one hand, the complicated contouring of the inside of the housing in the region of the closing element seats and the complicated contouring of the closing elements which is intended to bring about deflection of the seat-cleaning flow of cleaning medium in order to avoid the closing sealing element being acted on directly. For this purpose, complex fluidic considerations are necessary in order to find the suitable contouring.

SUMMARY OF THE INVENTION

The invention is based on the object of developing a double seat valve of the type mentioned at the beginning to the effect that, using structurally simple measures, the cleaning medium is prevented from flowing directly against the at least one sealing element of the closing element which is in the closed position during the lifting of the other closing element, which flow could lead to a impact pressure at the sealing element.

According to the invention, a double seat valve for separating media is provided, comprising a valve housing having connectors for a first pipeline and a second pipeline; a first closing element and a first closing element seat, the first closing element being in seal-forming abutment, in a closed position of the first closing element, with the first closing element seat via at least one first sealing element; a second closing element spaced apart axially from the first closing element and a second closing element seat, the second closing element being, in a closed position of the second closing element, in seal-forming abutment with the second closing element seat via at least one second sealing element; wherein the first and second closing elements can be lifted independently of one another from the respective first and second closing element seats; a leakage space being provided between the first and second closing elements; a flow barrier element arranged between the first and second closing elements, the flow barrier element shadows at least one of the at least one first and second sealing elements, the first or second closing element seats of one of the first or second closing elements which is in the closed position, when the other of the first or second closing elements is lifted and when cleaning medium is applied to the leakage space, the flow barrier element preventing the cleaning medium which enters the leakage space from flowing directly against the at least one of the first or second sealing elements, the first or second closing element seats of the one of the first or second closing element which is in the closed position.

In contrast to the known double seat valve specified at the beginning, in the double seat valve according to the invention a measure is taken to avoid a situation in which the cleaning medium which is flowing in axially through the gap between the closing element which is lifted and its valve seat is applied directly to the sealing element and/or the closing element seat of the respective closing element which is in the closed position, by virtue of the fact that the flow barrier element screens the flow or throws a flow shadow in which the sealing element of the closing element which is in the closed position is located. This avoids a direct flow against the sealing element and/or the closing element seat of the closing element which is in the closed position. In a processing system in which the double seat valve according to the invention is used, it is therefore possible for a product process to run in one pipeline while at the same time when the closing element is correspondingly lifted the leakage space, the closing element seat and the sealing element of the closing element which is lifted can be thoroughly cleaned by means of the other pipeline without there being the risk of cleaning medium penetrating the pipeline in which the product process is currently running.

Providing a separate flow barrier element has, compared to the double seat valve known from WO 2007/054131 A1, the advantage of a structural configuration which is significantly simpler, in particular it is not necessary to arrange the two closing element seats with a radial offset with respect to one another in the valve housing. The double seat valve according to the invention therefore advantageously permits a configuration with two closing element seats with the same diameter, as is already the case in the double seat valve which is known from DE 10 2005 057 103 A1. The valve housing is therefore significantly easier and more cost-effective to manufacture. Complicated contouring of the sides of the two closing elements which face one another is also eliminated in the double seat valve according to the invention.

"Shadowing" is to be understood according to the invention as meaning that the cleaning medium is not applied directly, and therefore at a high flow rate, to the sealing element of the respective closing element which is in the closed position, and within the scope of the invention here it is permitted that cleaning medium passes essentially unpressurized and at a low flow rate into the region of the closing element seat or of the sealing element of the closing element which is in the closed position so that a impact pressure cannot build up there.

The further advantage of the flow barrier element provided according to the invention is that, in particular in the case of closing element seats with the same diameters, it can act on two sides, i.e. when the first closing element is lifted, the flow barrier element shadows the second closing element seat or the associated sealing element, and when the second closing element is lifted the flow barrier element shadows the first closing element seat and/or the associated sealing element.

In the simplest case, the flow barrier element can simply be embodied as an annular element which is located between the two closing element seats and has, in the radial direction, a material width which is sufficient for the previously described shadowing effect. This ensures unimpeded discharging of cleaning medium without a pressure build up in the leakage space.

In one preferred refinement, the flow barrier element bears radially on the housing between the two closing element seats at least in the lifting position of the first or second closing element.

It is advantageous here that the shadowing effect or barrier effect extends radially outwards as far as the inside of the housing on which the two closing element seats are located. The flow barrier element does not have to bear against the housing in a completely seal-forming fashion here since, as already mentioned above, it is sufficient if the flow barrier element avoids a situation in which the cleaning medium flows directly against the closing element seat or the sealing element of the closing element which is in the closed position. The flow barrier element can therefore be composed of plastic, for example in its housing-side edge region, but it can also be composed of metal, in which case, for example, a sliding ring is then attached to the edge of the flow barrier element.

As an alternative to the refinement mentioned above, the flow barrier element is spaced apart from the housing by a small gap.

It is not absolutely necessary for the flow barrier element to bear on the housing between the two closing element seats in order to avoid a situation in which the cleaning medium acts at a high flow rate on the sealing element and/or the closing element seat of the closing element which is in the closed position. Although cleaning medium can pass through the gap between the flow barrier element and the inside wall of the housing, the small gap reduces the flow rate of the cleaning medium to such an extent that a impact pressure cannot build up in the region of the sealing element of the closing element which is in the closed position. Providing a correspondingly small gap between the flow barrier element and the inside wall of the housing has, in the case of axial mobility of the flow barrier element, the advantage that friction does not occur between the flow barrier element and the housing.

In a further preferred refinement, the flow barrier element can be moved axially.

While axial mobility is not absolutely necessary for the purposes of lifting of the one or the other closing element, this measure has the advantage, when completely opening the two closing elements, that the flow barrier element, together with the two closing elements, can move away from the region of the two closing element seats. For axial mobility it is not necessary for the flow barrier element to be provided with its own drive because when the two closing elements move together in the same direction, the flow barrier element can be carried along by the two closing elements owing to its arrangement between said two closing elements.

The axial mobility comprises axial mobility of the flow barrier element relative to at least one of the closing elements and/or mobility together with at least one of the closing elements.

In a further preferred refinement, the flow barrier element has, radially on the outside, a sliding element which bears against the housing, or is itself composed of a slidable material radially on the outside.

It is advantageous here that when the two closing elements move into the open position, the flow barrier element does not form any increased frictional resistance with the inside of the housing, which furthermore has the advantage that after a number of opening and closing strokes the flow barrier element is not subject to any significant wear owing to increased friction.

In a further preferred refinement, in a common open position of the two closing elements, the flow barrier element forms a seal axially against the two closing elements.

In the open position of the two closing elements, i.e. in the open position of the double seat valve, the two pipelines communicate with one another so that a medium can pass from one pipeline into the other pipeline. The open position in such double seat valves is usually brought about by virtue of the fact that one of the closing elements is moved towards the other closing element, and subsequently the two closing elements are moved further in the same direction. Since the flow barrier element is now arranged between the two closing elements, the measure specified above advantageously ensures that medium cannot penetrate between the two closing elements and the flow barrier element and into the leakage space.

In a further preferred refinement, in the closed position of the two closing elements, the flow barrier element is spaced apart axially from the two closing elements by a gap.

Since the flow barrier element is located between the two closing elements, and therefore in the leakage space, this measure advantageously has the effect that when there is a leak in at least one of the sealing elements of the two closing elements, it can be detected despite the presence of the flow barrier element since the leakage can specifically penetrate through the gap between the flow barrier element and the two closing elements and into the leakage space, which can be sensed either through the discharge of the leak into the surroundings or through corresponding detectors.

In a further preferred refinement, the flow barrier element has, on at least a side facing one of the closing elements, a contour which brings about an at least partial deflection of flow of cleaning medium from an axial direction into an essentially radial direction.

Such deflection of the flow by the flow barrier element has the advantage of better flushing of the leakage space and therefore also of the closing element seat of the closing element which is lifted.

In a further preferred refinement, the flow barrier element is arranged loosely between the two closing elements.

This refinement constitutes a structurally advantageously very easy way to implement the flow barrier element between the two closing elements in the leakage space. Owing to the loose arrangement, the flow barrier element is not moved along when one of the two closing elements is lifted, however it is possible to provide that when the pressurized cleaning medium is introduced the flow barrier element has a certain degree of axial play which allows the flow barrier element to take up some of the pressure. Furthermore, the flow barrier element can be forced towards the other closing element by the cleaning medium for the sake of optimum cleaning of the closing element seat of the closing element which is lifted, and this also increases the effect of the flow barrier in protecting the closing element which is in the closed position. When the two closing elements are opened, the flow barrier element is then moved along between the two closing elements in a sandwich arrangement, as has already been described above.

In this context it is preferred if the flow barrier element is guided axially on a drive element of one of the two closing elements.

Given the loose arrangement of the flow barrier element between the two closing elements, this measure has the advantage that when cleaning medium is applied said flow barrier element cannot tilt in such a way that either the barrier effect is reduced or the flow barrier element cants in the leakage space.

In the context of the two previously specified refinements, the flow barrier element can be embodied as a ring or as a spoked wheel.

In the case of the refinement as a spoked wheel, said spoked wheel can be guided axially on the previously specified drive element of one of the two closing elements, while the intermediate spaces between the spokes ensure a large passage cross section for cleaning medium to be discharged through the flow barrier element.

As an alternative to the previously specified loose arrangement of the flow barrier element between the two closing elements, in one variant there is provision that the flow barrier element is attached to one of the closing elements with relative axially limited play, wherein a spring, whose effect on the flow barrier element is directed away from this closing element, is arranged between this closing element and the flow barrier element.

This refinement has the advantage that, owing to the attachment of the flow barrier element to one of the two closing elements, said flow barrier element is guided in a defined fashion during all movements of the closing elements. The relative axially limited play which is provided in this refinement between the flow barrier element and the closing element to which it is attached and the spring which is provided between this closing element and the flow barrier element have the advantage that in the closed position of this closing element the flow barrier element can be held at a distance from the closing element equivalent to the axial play, with the result that leakage between this closing element and the flow barrier element can penetrate the leakage space if the sealing effect of this closing element fails. When the double seat valve is opened completely, the closing element to which the flow barrier element is attached then moves towards the flow barrier element and in addition presses it against the other closing element, as a result of which, in the open position, the arrangement composed of the first closing element, flow barrier element and second closing element is completely sealed with respect to the leakage space. When pressurized cleaning medium is applied to the leakage space, the flow barrier element can be forced by the cleaning medium towards the closing element to which it is attached, which permits even more thorough cleaning of the closing element seat of the closing element which has been lifted.

In a further alternative refinement, the flow barrier element is mounted in a floating fashion between the two closing elements by means of at least springs which act in opposite directions.

This refinement differs from the previously specified refinement of a flow barrier element which is arranged loosely between the two closing elements in that the two springs which act in opposite directions to one another cause the flow barrier element to have a mechanical operative connection to each of the two closing elements, with the result that the flow barrier element is moved along when a closing element is lifted, similarly to the previously specified variant. In contrast to the previously specified variant in which the flow barrier element is attached to one of the closing elements but is not mechanically operatively connected to the other closing element, there is now the mechanical operative connection to both closing elements but without "rigid" attachment to one or the two closing elements, which brings about symmetry between the lifting processes of the two closing elements. This improves the cleaning of the two closing element seats compared to the previously specified refinement.

Furthermore, the presence of two springs which act in opposite directions has the advantage that when a closing element is lifted the flow barrier element is not moved with the closing element with the same stroke as this closing element which is lifted but rather with a stroke which is about half the lifting stroke with the result that the flow barrier element does not cover the closing element seat of the closing element which is lifted and as a result makes the cleaning of this closing element seat more difficult. Furthermore, the floating arrangement also in turn allows the flow barrier element to be moved, as a result of the pressure of the cleaning medium, towards the other closing element which is in the closed position, and this, on the one hand, increases the flow barrier effect and, on the other hand, improves the cleaning of the closing element seat of the closing element which is lifted.

In a further preferred refinement, a locking mechanism is provided which, when one of the closing elements is lifted, locks the flow barrier element to the other closing element.

This measure is advantageous in particular in conjunction with the previously specified refinement of the double seat valve because the locking mechanism has the effect that despite the mechanical operative connection of the flow barrier element to both closing elements, the flow barrier element remains in the direct vicinity of the other, closed closing element when a closing element is lifted. As a result, the closing element seat of the closing element which is lifted can be even more thoroughly cleaned.

In yet another preferred refinement of this aspect, in the position in which it is locked to the respective closing element, the flow barrier element can move axially with respect to this closing element when pressure is applied.

This permits optimum cleaning of the closing element seat of the closing element which is lifted because when a closing element is lifted, the flow barrier element remains in the direct vicinity of the other closing element and can even be moved further towards it, which is simply brought about by the pressure of the cleaning medium.

In one preferred refinement of the locking mechanism, the flow barrier element has a sleeve which is arranged radially between a first drive element of the first closing element and a second drive element of the second closing element and can move axially in relation to the two drive elements, wherein the locking mechanism has at least one locking element which is connected to the sleeve and which is held in such a way that it engages alternately in recesses in the first or second drive element in order to lock the sleeve to the respective closing element.

This measure has the advantage of a structurally very simple design of the locking mechanism which requires few parts in permitting the previously specified locking of the flow barrier element to the respective closing element which is in the closed position when the other closing element is lifted.

In a further preferred refinement, the flow barrier element has a drainage section whose overall passage cross section is at least as large as the opening cross section of the larger of the two connectors.

This refinement is advantageous in particular in conjunction with those refinements of the flow barrier element in which the flow barrier element is connected centrally via a connecting section to the drive of the closing elements and is guided axially in this way. In this refinement, the drainage section of the flow barrier element ensures that the requirement, mentioned in the introduction to the description, to avoid a build up of overpressure in the leakage space when cleaning medium is introduced is met by virtue of the fact that a sufficient amount of cleaning medium can be discharged through the drainage section of the flow barrier element.

In a preferred structural refinement the drainage section has a plurality of spokes which are directed obliquely with respect to the radials.

This refinement which is known per se from DE 10 2005 057 103 A1 for one of the closing elements brings about the same advantages for the flow barrier element in that the oblique position of the drainage section permits the overall opening cross section of the drainage section to be maximized without increasing the diameter of the element influenced by flow.

Further advantages and features emerge from the following description and the appended drawing.

Of course, the features which are specified above and are to be explained below can be used not only in the respectively indicated combination but also in other combinations or alone without departing from the scope of the present invention.

BRIEF DESCRIPTION OF THE DRAWINGS

Exemplary embodiments of the invention are illustrated in the drawing and will be explained in more detail below with reference thereto. In said drawing.

DETAILED DESCRIPTION OF THE INVENTION

Figure 1:
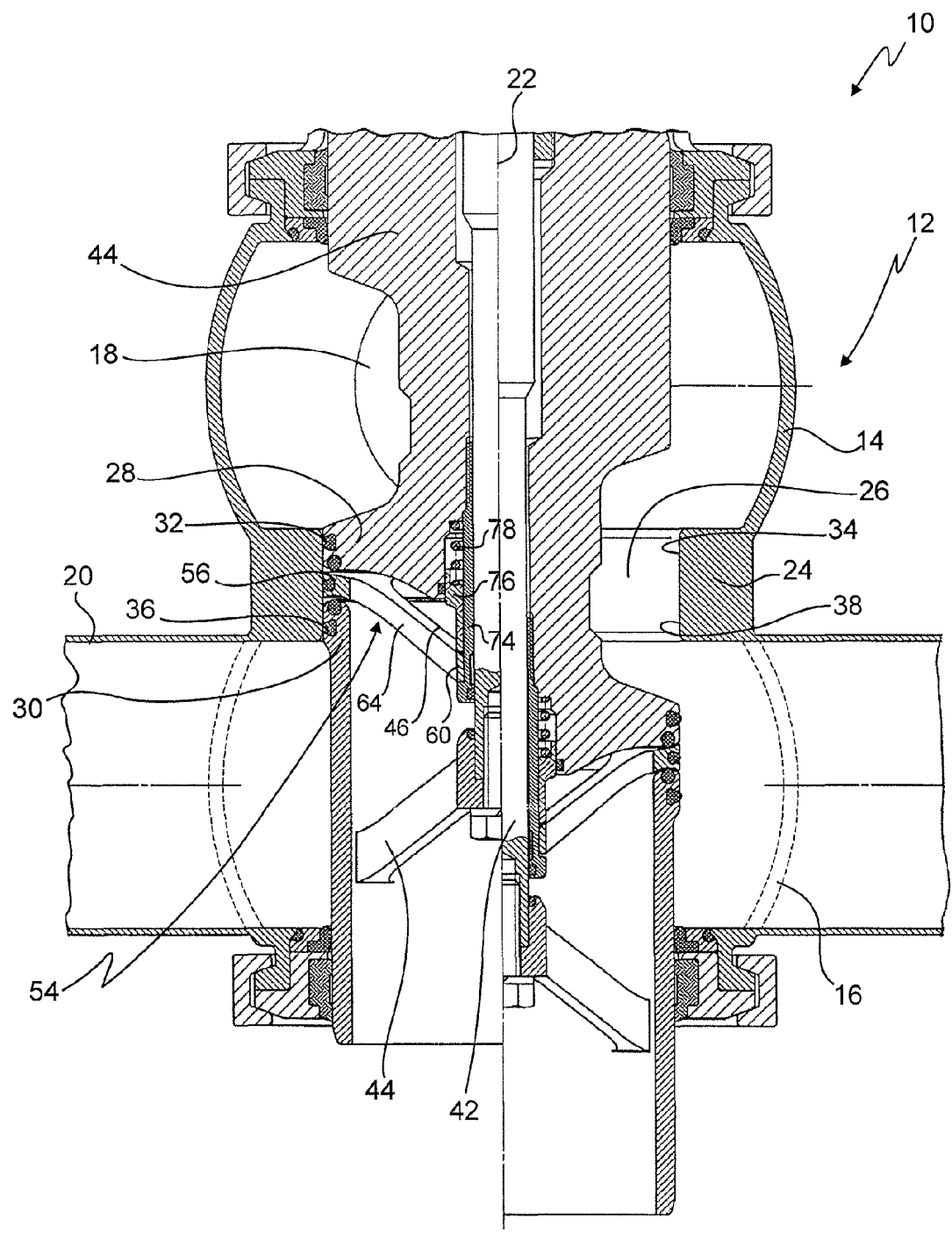
FIG. 1 shows a double seat valve in a detail and in longitudinal section according to a first exemplary embodiment, wherein the double seat valve is shown in a first operating state in the left-hand half of the drawing and in a second operating state in the right-hand half of the drawing.
Figure 2:
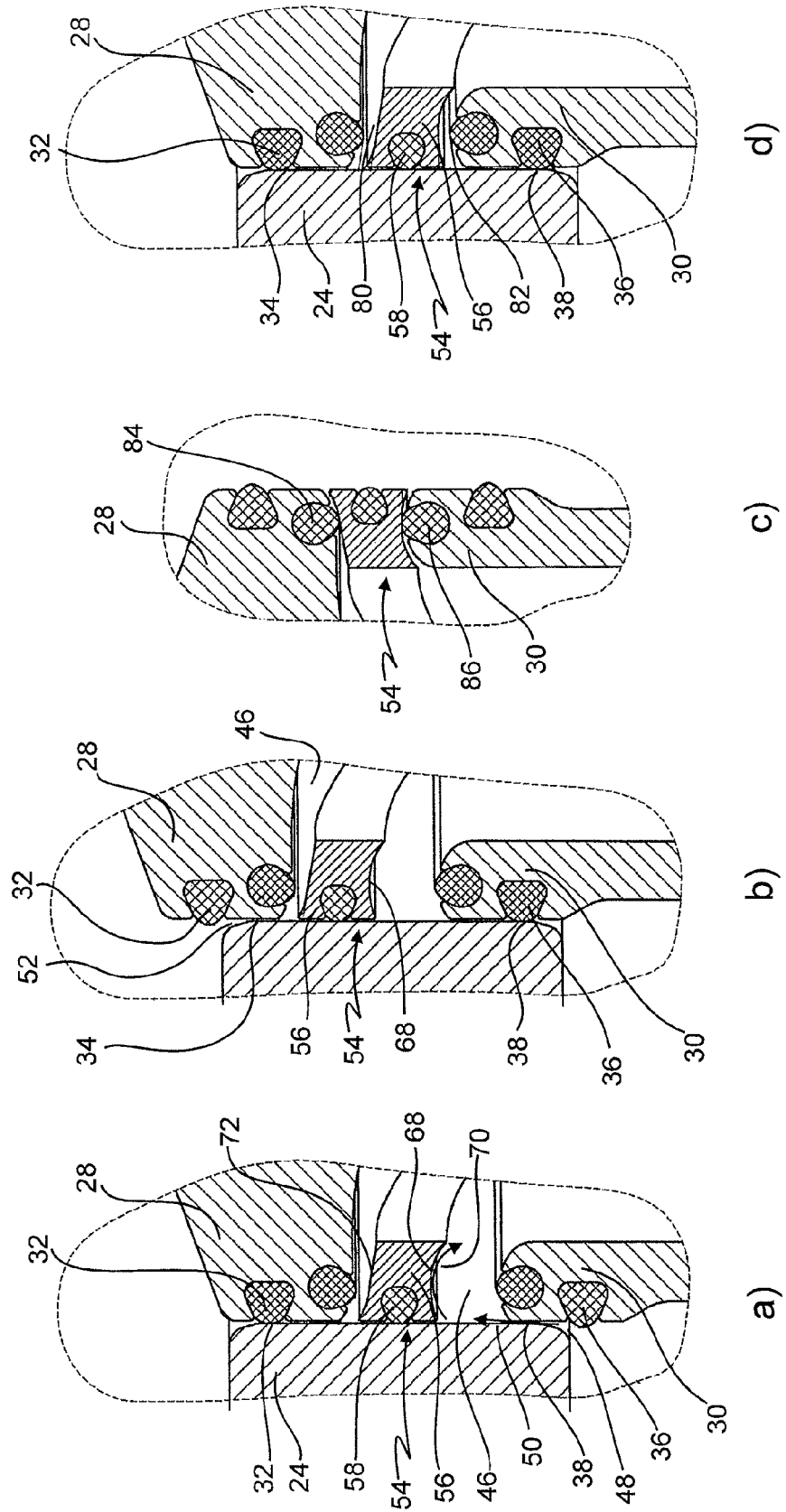
FIGS. 2a) to d) show four detail views of the double seat valve in FIG. 1 in four different operating positions of the double seat valve.

FIG. 1 illustrates a double seat valve which is provided with the general reference sign 10 and has the purpose of separating incompatible media. Further details of the double seat valve 10 are shown in FIGS. 2a) to d) and in FIGS. 3a) and b).

The double seat valve 10 is used, for example, in a foodstuff processing system which is used to manufacture foodstuffs.

The double seat valve 10 has a valve housing 12 which has a first valve housing section 14 and a second valve housing section 16. A first connector for connecting a first pipeline (not illustrated) to the double seat valve 10 is arranged on the first valve housing section 14, and a second connector 20 for connecting a further pipeline (not illustrated) to the double seat valve 10 is arranged on the second valve housing section 16, the connectors 18 and 20 in the exemplary embodiment shown being arranged offset with respect to one another by 90° with respect to a longitudinal centre axis 22 of the double seat valve 10. In the present description, the longitudinal centre axis 22 defines the axial direction of the double seat valve 10.

Between the first valve housing section 14 and the second valve housing section 16, the valve housing 12 has a connecting section 24 which bounds, on the inside, a connecting opening 26 via which the interiors of the valve housing sections 14 and 16 communicate with one another in the open state of the double seat valve 10, as will be described below.

The connecting opening 26 has a free cross section which is at least as large as the opening cross section of the largest of the connectors 18 and 20, respectively.

A first closing element 28 and a second closing element 30 are arranged in the valve housing 12. The first closing element 28 is, without restricting the general application, embodied in the form of a valve disc, and the second closing element 30 is embodied in the form of a closing sleeve.

The first closing element 28 has at least one, here precisely one, sealing element 32 which, in the closed position of the first closing element 28 (left-hand half of the drawing in FIG. 1), abuts with a first closing element seat 34 in a seal-forming fashion, wherein the first closing element seat 34 is arranged on the inside of the connecting section 34 of the valve housing 12. The second closing element 30 correspondingly has at least one, here precisely one, sealing element 36 which, in the closed position of the second closing element 36 (left-hand half of the drawing in FIG. 1), abuts with a second closing element seat 38 in a seal-forming fashion.

Both the sealing element 32 and the sealing element 36 are radially seal-forming sealing elements. As is apparent from FIG. 1, the first closing element seat 34 and the second closing element seat 38 are spaced apart axially from one another and both have the same diameter on the inside of the connecting section 24 of the valve housing 12.

The first closing element 28 is connected to a drive element 40, and the second closing element 30 is connected to a drive element 42, and this connection can be in one piece or multiple pieces, with the drive elements 40 and 42 being connected to a control mechanism (not illustrated and known per se) for axially moving the closing elements 28 and 30.

The second closing element 30 is connected to the drive element 42 via a drainage section 44, which is embodied as described in DE 10 2005 057 103 A1, to which reference is made for further details and whose disclosure content is included in the present application.

Between the first closing element 28 and the second closing element 30 there is a leakage space 46 which, in the closed state of the double seat valve 10 (left-hand half of the drawing in FIG. 1), serves to permit leakage to be discharged through the drainage section 44 of the closing element 30 into the external surroundings in order to permit a leakage state to be detected when there is a leak in one or both of the sealing elements 32, 36.

The left-hand half of the drawing in FIG. 1 shows the closing elements 28 and 30 in their common closed position in which the interior of the valve housing section 14 is closed off in a hermetically sealed fashion from the interior of the valve housing section 16.

The right-hand half of the drawing in FIG. 1 shows the two closing elements 28 and 30 in their common open position in which the closing elements 28 and 30 are moved away from their respective valve seat 34, 38 by corresponding activation of the control drive via the drive elements 40 and 42, with the result that the connecting opening 26 between the valve housing sections 14 and 16 is opened. In this case, for example a product medium can be transferred from the connector 18 into the connector 20.

However, the double seat valve 10 has, in addition to these two operating states shown in FIG. 1, two further operating states which are referred to as "lifting" one of the respective two closing elements 28 or 30.

FIG. 2a) shows an operating state in which the second closing element 30 is lifted from its closing element seat 38.

The lifting stroke is of just such a size that the sealing element 36 of the closing element 30 moves out of abutment with the closing element seat 38.

The closing element 28 remains in its seal-forming closed position during the lifting of the closing element 30, as is apparent from FIG. 2a).

FIG. 2b) shows an operating state in which the first closing element 28 is lifted from its closing element seat 34, with the result that the sealing element 32 is no longer in seal-forming abutment with the closing element seat 34. In contrast, in this operating position the second closing element 30 is in its seal-forming closed position, as is apparent from FIG. 2b).

The operating state according to FIG. 2a) serves to introduce a cleaning medium through a gap 48 between the closing element 30 and the valve seat 38 and into the leakage space 46 according to an arrow 50. The direction of introduction is essentially axial here. The cleaning medium is fed here via the connector 20 and the pipeline which is connected thereto. In particular the sealing element 48 and the valve seat 38 and also the interior of the leakage space 46 are thoroughly cleaned with the cleaning medium.

In the operating state according to FIG. 2b), a pressurized cleaning medium is fed in via the connector 18 and the pipeline connected thereto, and is fed into the leakage space 46 via a gap 52 between the closing element 28 and the valve seat 34.

In both cases according to FIGS. 2a) and b) it is necessary to ensure that the cleaning medium which is introduced axially does not flow against the sealing element (sealing element 32 in FIG. 2a) and sealing element 36 in FIG. 2b)) which is respectively in seal-forming abutment and/or against the associated closing element seat 34 and 38, respectively, in such a way that the cleaning medium penetrates into the respective other valve housing section 14 or 16, respectively, between the sealing element 32 or 36, respectively, which is in seal-forming abutment and the associated closing element seat 34 and 38, respectively. This ensures that, by means of the respective valve housing section 14 or 16 whose associated closing element 28 or 30 is in its closed position, a product process can run without the product medium being contaminated by the cleaning medium.

In order to meet these previously specified requirements, a flow barrier element 54 is arranged between the first closing element 28 and the second closing element 30. The flow barrier element 54 avoids a direct action on, or direct flow against, the sealing element or the associated closing element seat which is in the closed position, while the other closing element is lifted. In FIG. 2a), the flow barrier element 54 therefore prevents the sealing element 32 or the closing element seat 34 of the first closing element 28 from being acted on directly, and in FIG. 2d) the flow barrier element 54 prevents the cleaning medium being applied directly to the sealing element 36 or the closing element seat 38 of the closing element 30 by virtue of the fact that the flow barrier element 54 shadows or screens the sealing element or the closing element seat of the closing element which is in the closed position.

Figure 3A:
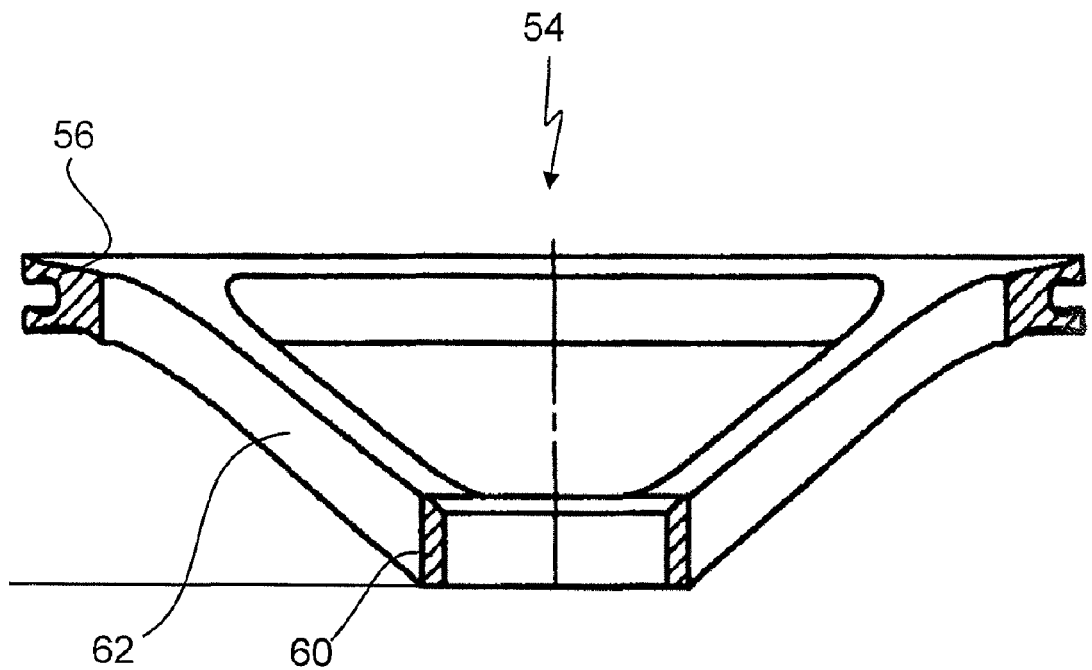
FIGS. 3a) and b) show a flow barrier element of the double seat valve in FIG. 1 on its own and on an enlarged scale, with FIG. 3a) being a longitudinal section and FIG. 3b) being a perspective view of the flow barrier element.
Figure 3B:
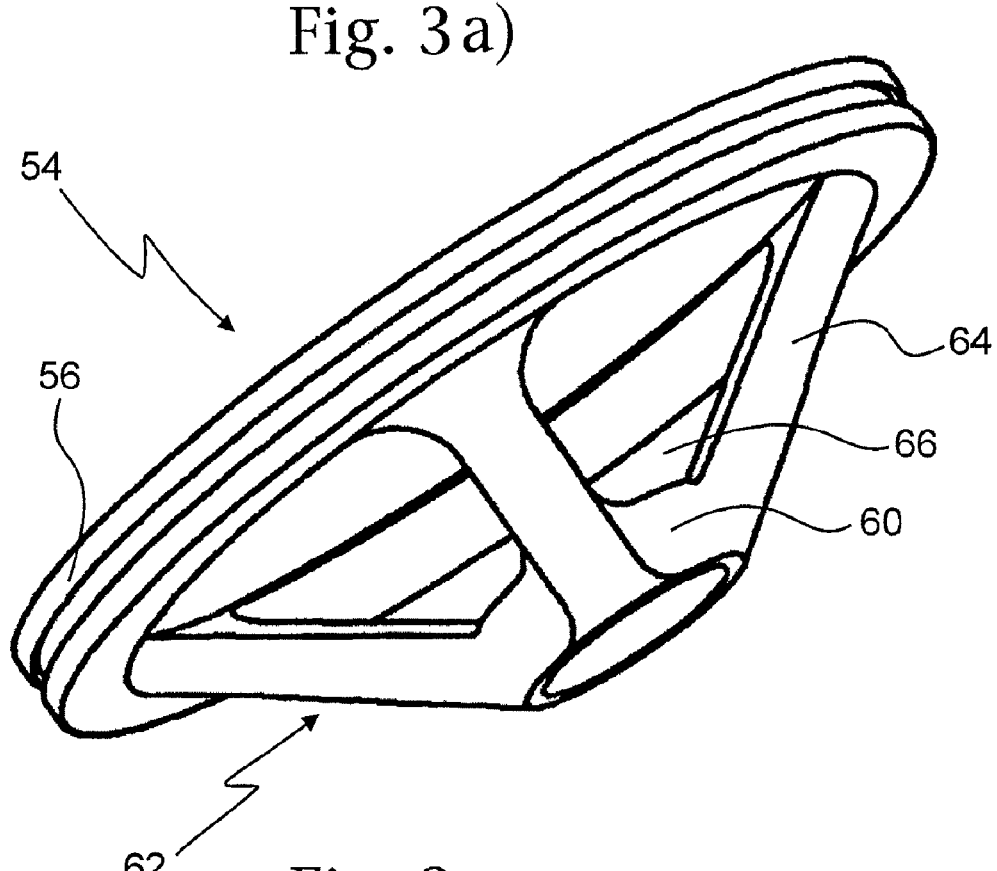

The flow barrier element 54 will firstly be described in more detail with reference to FIGS. 3a) and 3b). The flow barrier element 54 has an annular element 56 which extends around the entire circumference and whose outer diameter corresponds to the inner diameter of the connecting section 24 of the valve housing 12. The annular element 56 constitutes the actual flow barrier. The annular element 56 accommodates a sliding element 58 which bears radially on the housing side in the closed position of the two closing elements 28, 30 according to FIG. 1 (left-hand half of the drawing) and bears on the housing side in the lifting positions of the closing element 30 according to FIG. 2a) or of the closing element 28 according to FIG. 2b). The sliding element 58 does not perform a seal-forming function here with respect to the connecting section 24 of the valve housing 12 but rather is merely intended to avoid a situation in which the cleaning medium under pressure can penetrate between the inside of the connecting section 24 and the outside of the annular element 56.

In an alternative refinement of the flow barrier element, the sliding element 58 can also be absent, with the result that a small gap remains free between the flow barrier element 54 and the inside of the connecting section 24 of the valve housing 12, as a result of which cleaning medium can pass through the gap but the flow rate of the cleaning medium is greatly reduced by the gap effect, with the result that impact pressure cannot build up at the closing element seat which is in the closed position or at the associated sealing element of the respective closing element.

The flow barrier element 54 has radially on the inside a connecting section 60 with which the flow barrier element 54 in the exemplary embodiment according to FIG. 1 is connected to the drive element 40 of the closing element 28 or attached thereto.

Between the annular element 56 and the connecting section 60, the flow barrier element 54 has a drainage section 62 which has a plurality of spokes 64 between which there are correspondingly a plurality of openings 66 whose overall passage cross section is at least as large as the opening cross section of the larger of the two connectors 18 and 20, respectively. In order to achieve this, the spokes and therefore the openings 66 are positioned obliquely with respect to the radial direction, i.e. the spokes 64 have an axial component between the annular element 56 and the connecting section 60.

The flow barrier element 54, to be more precise the annular element 56 of the flow barrier element, has, on the side facing the closing element 30, a contour 68 (cf. FIG. 2a)) which brings about at least partial deflection of the flow of the cleaning medium from its axial direction according to the arrow 50 into an essentially radial direction, as indicated in FIG. 2a) with an arrow 70. The contour 68 is embodied here in the form of a concavely curved chute.

On the side facing the closing element 28, the flow barrier element 54, to be more precise the annular element 56 of the flow barrier element 54, has a contour 72 which is embodied in such a way that the side of the annular element 56 which faces the closing element 28 runs radially inward and obliquely downward. The contours 68 and 72 of the flow barrier element 54 mainly have the function of distributing satisfactorily the pressurized cleaning medium in the leakage space 46, and do not have the primary function of preventing the closing element seat or the associated sealing element which faces away from the cleaning medium entry from being acted on directly. The presence of the flow barrier element 54 even without the contours 68 and 72 already does this.

As already mentioned above, the flow barrier element 54 in the exemplary embodiment according to FIG. 1 is attached to the first closing element 28 and as a result guided axially, and here the flow barrier element 54 still has a certain degree of axially limited play with respect to the first closing element 28. For this purpose, the flow barrier element 54 is seated with its connecting section 60 between a first sleeve 74, which is non-movably connected to the first closing element 28, and a second sleeve 76, which can move, with the axially limited play, in the axial direction in relation to the first sleeve 74, and which presses the second sleeve 76, and therefore the connecting section 60, axially away from the first closing element 28 by means of a spring 78 which is supported at one end on the closing element 28 and at the other end on the second sleeve 74 and is embodied as a compression spring and whose effect on the flow barrier element 54 is, in other words, directed away from the closing element 28.

The meaning of the axially limited play between the flow barrier element 54 and the closing element 28 and the pre-stress of the flow barrier element 54 in the direction away from the closing element 28 will be described below.

In the common closed position of the closing elements 28 and 30 according to FIG. 1 (left-hand half of the drawing, or FIG. 2d)), the flow barrier element 54, to be more precise the annular element 56 thereof, is at an axial distance both from the closing element 28 and from the closing element 30, which is brought about by means of the spring 78. In this operating state, there is a gap 80 between the closing element 28 and the annular element 56 of the flow barrier element 54, and there is a corresponding gap 82 between the annular element 56 of the flow barrier element 54 and the closing element 30. The gaps 80 and 82 serve to ensure that, in the case of undesired leakage of the closing element 28 and/or the closing element 30, leakage fluid runs through the gap 80 or 82 and into the leakage space 46 and is discharged into the surroundings through the drainage section 62 of the flow barrier element 54 and the drainage section 44 of the closing element 30 and can therefore be detected.

When the first closing element 28 is lifted, the flow barrier element 54 is moved axially together with the closing element 28 by virtue of its attachment to said closing element 28.

When the double seat valve 10 is transferred from the common closed position of the closing elements 28 and 30 according to the left-hand half of the drawing in FIG. 1 into the common open position according to the right-hand half of the drawing in FIG. 1, the closing element 28 firstly moves against the flow barrier element 54 by overcoming the axially limited play between the closing element 28 and the flow barrier element 54, and the closing element 28 and the flow barrier element 54 then both move together against the closing element 30 in order to also move it from its closing element seat 38 into the open position. The axially limited play between the closing element 28 and the flow barrier element 54 accordingly serves, inter alia, to close the gap 80 in the common open position of the closing elements 28 and 30. The gap 82 between the annular element 56 and the closing element 30 closes here owing to the fact that the flow barrier element 54 can move relative to the closing element 30.

In order to ensure that there is a seal between the closing elements 28, 30 and the annular element 56 of the flow barrier element 54 in the common open position of the closing elements 28 and 30, an axially acting sealing element 84 is arranged on the closing element 28, and an axially acting sealing element 86 is arranged on the closing element 30, which sealing elements 84 and 86 come into abutment in a seal-forming fashion with the flow barrier element 54, to be more precise with the annular element 56, in the common open position of the closing elements 28 and 30.

When the closing element 30 is lifted according to FIG. 2a), the flow barrier element 54 remains in its position, while maintaining the gap 80 to the closing element 28, since it does not have any mechanical operative connection to the closing element.

FIGS. 4 to 7 illustrate a further exemplary embodiment of a double seat valve 10a. All the elements and parts of the double seat valve 10a which correspond to those parts or elements of the double seat valve 10 are provided with the same reference sign as in the double seat valve 10, with an additional letter a.

In so far as certain parts, elements or aspects of the double seat valve 10a are not described in the following description, the corresponding description of these parts, elements or aspects of the double seat valve 10 with respect to the double seat valve 10a applies equally.

Essentially only the differences between the double seat valve 10a and the double seat valve 10 will be described below.

In the case of the double seat valve 10a, the flow barrier element 54a is not attached to one of the two closing elements 28a and 30a, respectively, but rather is mounted in a floating fashion between these two components.

For this purpose, the flow barrier element 54a is mounted between the closing elements 28a and 30a by means of two springs 90 and 92 which act in opposite directions, the spring 90 being supported between the closing element 28a and the flow barrier element 54a, and the spring 92 being supported between the closing element 30a and the flow barrier element 54a.

The flow barrier element 54a also has a sleeve 94 which is arranged between the drive element 40a of the closing element 28a and the drive element 42a of the closing element 30a so as to be capable of moving axially in relation to the two components. The springs 90 and 92 are supported here on a headpiece 96 of the sleeve 94. The spring 90 acts here on the sleeve 94 in the direction of the closing element 30a, and the spring 92 acts on the sleeve 94 in the direction of the closing element 28a.

Figure 4:
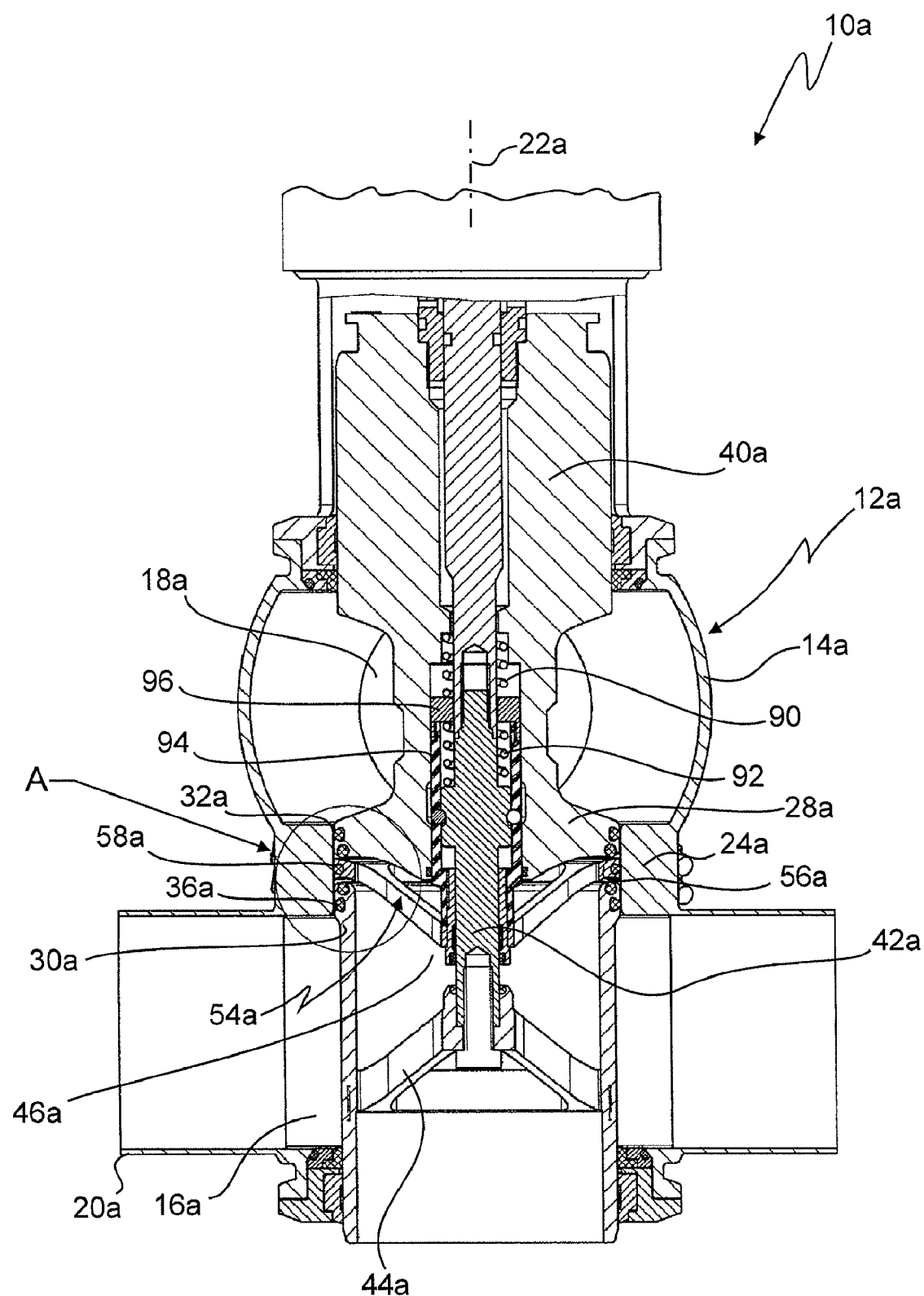
FIG. 4 shows a detail of a double seat valve in longitudinal section according to a further exemplary embodiment in a first operating position.

FIG. 4 shows the double seat valve 10a in an operating state in which the two closing elements 28a and 30a are in their closed position.

Figure 4A:
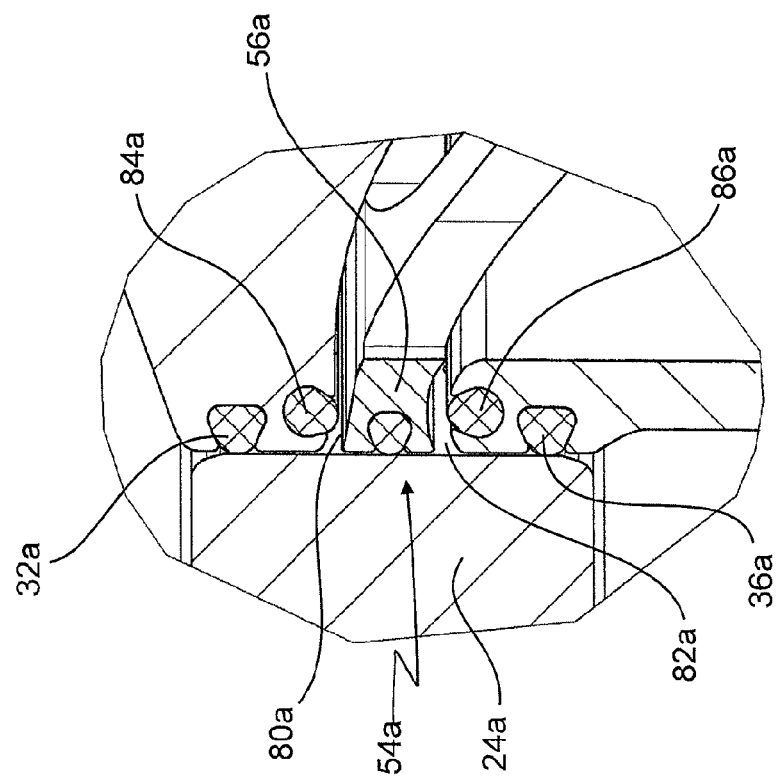
FIG. 4A shows a detail view of the double seat valve in FIG. 4.

FIG. 4A shows the detail A in FIG. 4 on an enlarged scale. It is again apparent that in this operating state the gap 80a or 82a is present between the closing elements 28a and 30a and the respectively facing side of the annular element 56a of the flow barrier element 54a.

Figure 5A:
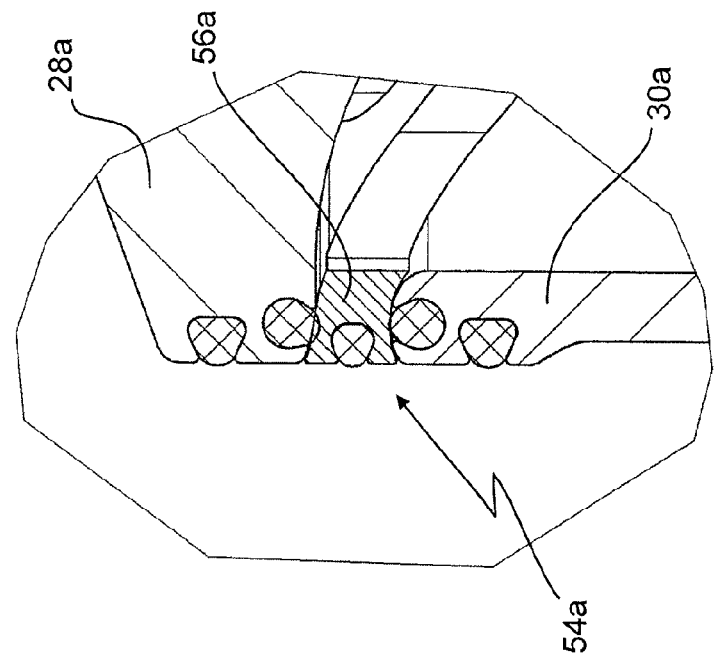
FIG. 5A shows a detail view of the double seat valve in the operating position according to FIG. 5 on an enlarged scale.
Figure 5:
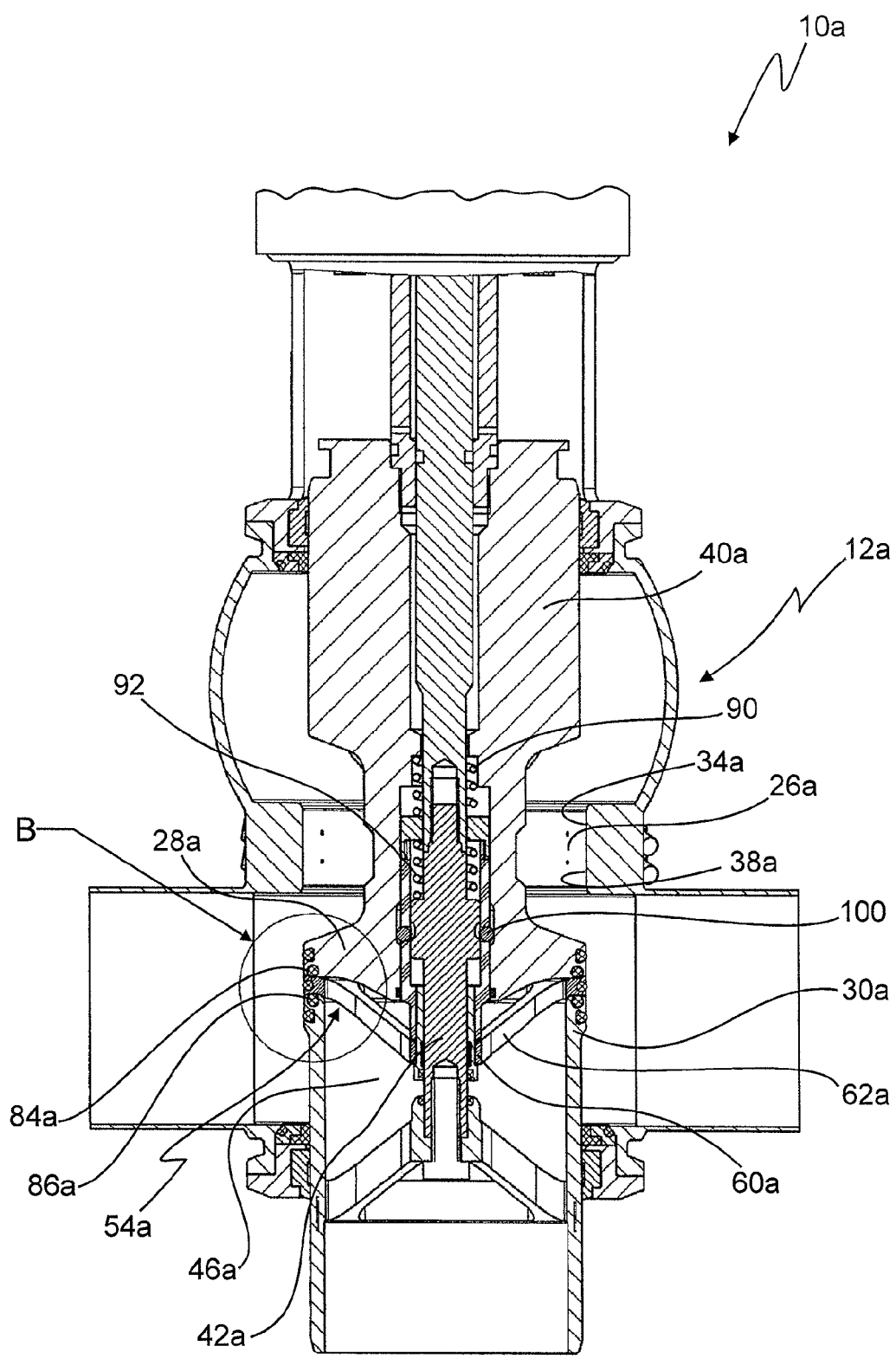
FIG. 5 shows the double seat valve in FIG. 4 in a second operating state.

FIG. 5 shows the double seat valve 10a in the common open position of the closing elements 28a and 30a with the flow barrier element 54a which is held here in a sandwich arrangement, and in this operating position here the leakage space 46a is hermetically sealed with respect to the interior of the valve housing 12a, which is ensured by the sealing elements 84a and 86a of the closing elements 28a and 30a.

FIG. 5A illustrates the detail B in FIG. 5 on an enlarged scale, with FIG. 5A showing the axial seal of the closing elements 28a and 30a with respect to the annular element 56a of the flow barrier element 54a.

Figure 6:
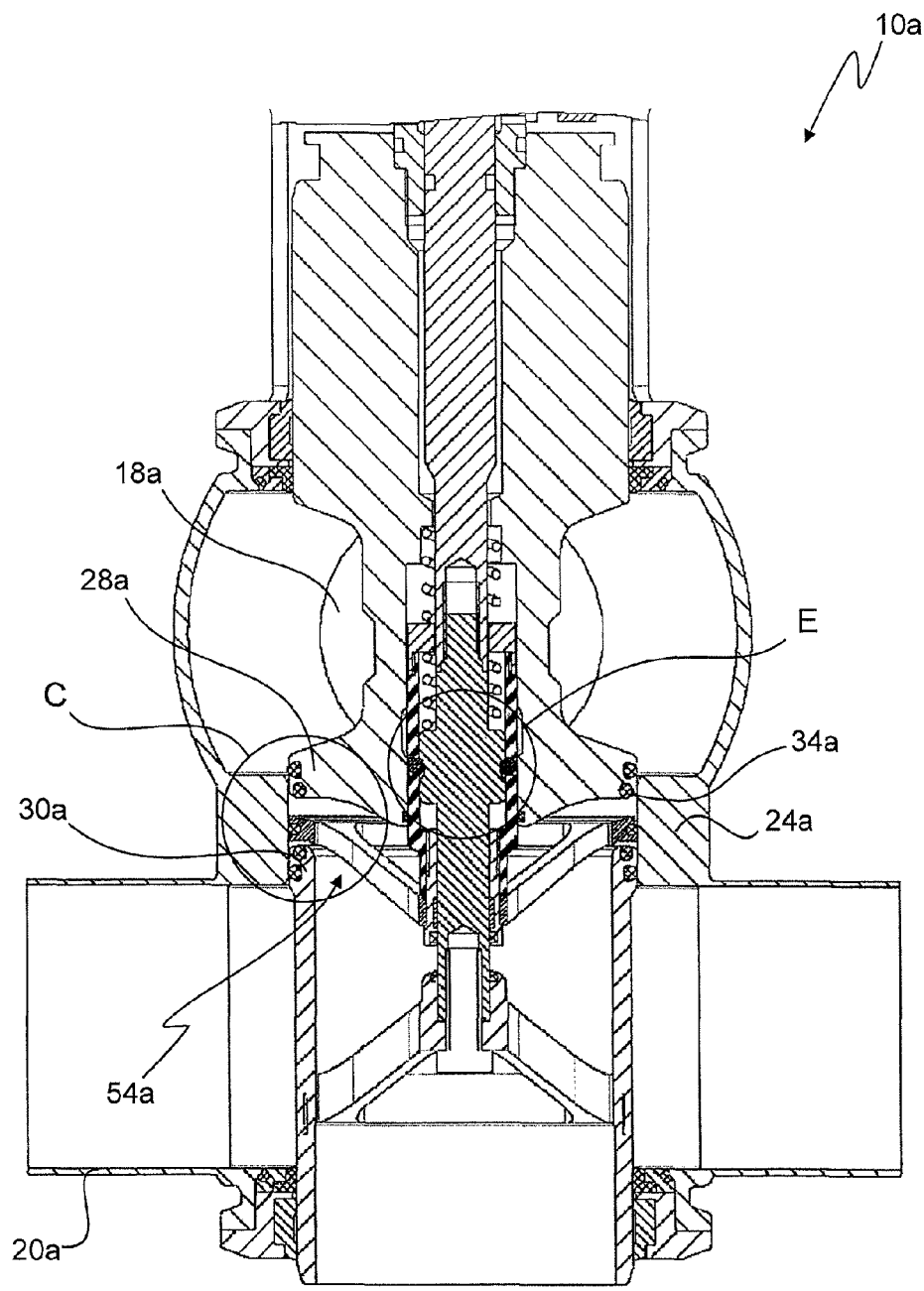
FIG. 6 shows the double seat valve in FIG. 4 in a third operating state.

FIG. 6 shows the double seat valve 10a in an operating state in which the closing element 28a is lifted from its closing element seat 34a for the purpose of introducing a pressurized cleaning medium.

Figure 6A:
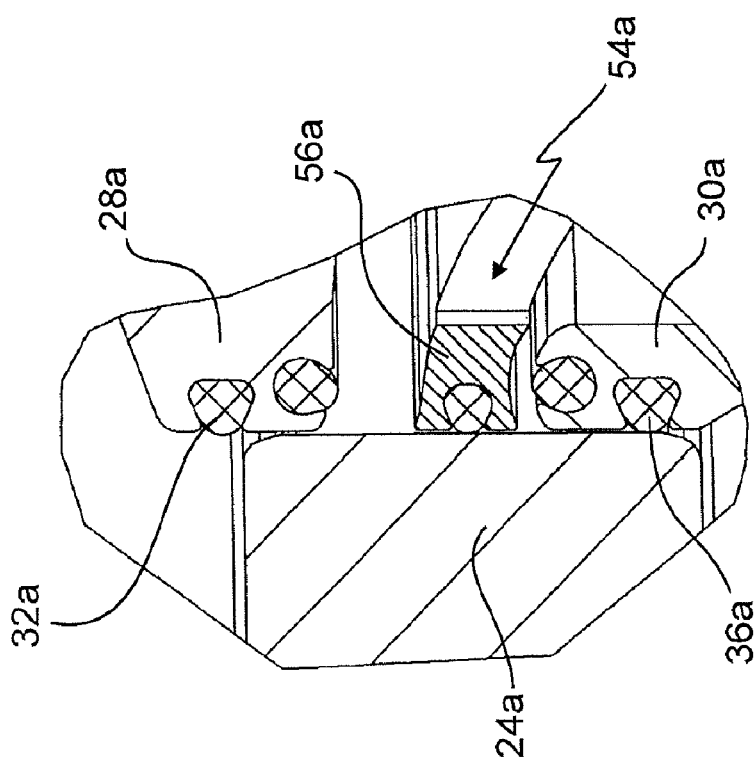
FIG. 6A shows a detail view of the double seat valve in the operating position according to FIG. 6.
Figure 6B:
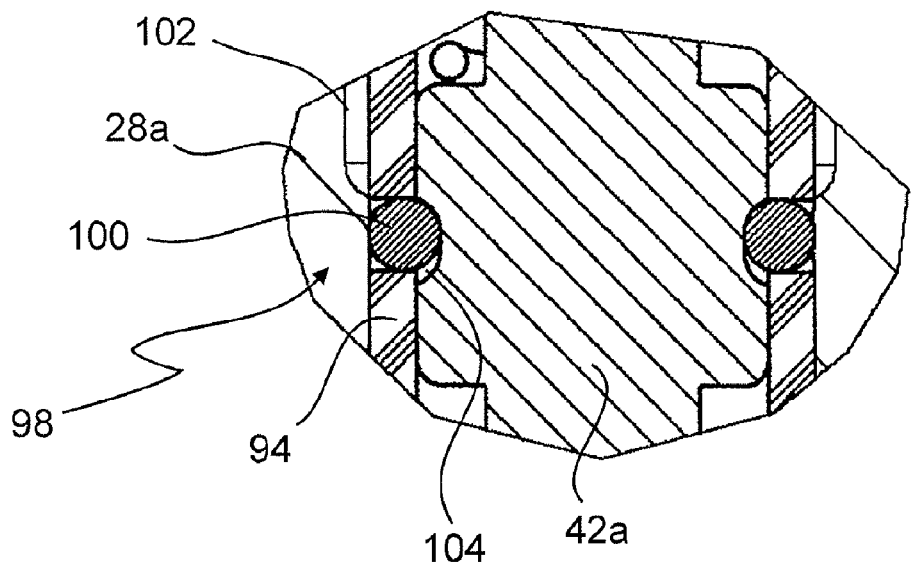
FIG. 6B shows a further detail view of the double seat valve in the operating position according to FIG. 6.

In this operating state, there is now a difference from the corresponding operating position of the double seat valve 10 according to FIG. 2b). While in the case of the lifting of the closing element 28 of the double seat valve 10 according to FIG. 2b) the flow barrier element 54 follows the closing element 28 in its lifting stroke owing to the attachment of said flow barrier element 54 to the closing element 28, the flow barrier element 54a of the double seat valve 10a in the operating position according to FIG. 6 remains approximately in the same position as in the common closed position of the closing elements 28a and 30a, as is apparent from the enlarged detail C (FIG. 6) in FIG. 6A. This is ensured by a locking mechanism 98 which is described with respect to FIG. 6B, which is an enlarged illustration of the detail E in FIG. 6.

The locking mechanism 98 locks the flow barrier element 54a in the case of lifting of the closing element 28a to the closing element 30a, and conversely the locking mechanism locks the flow barrier element 54a to the closing element 28a when the closing element 30a is lifted.

The locking mechanism 98 locks the flow barrier element 54a in the case of lifting of the closing element 28a to the closing element 30a, and conversely the locking mechanism locks the flow barrier element 54a to the closing element 28a when the closing element 30a is lifted.

The locking mechanism 98 has one or more locking elements 100 which engages/engage with the sleeve 94 to which the flow barrier element 54a is permanently connected. The locking elements 100 are embodied in the form of spheres which are arranged in radially open recesses in the sleeve 94. Furthermore, the locking mechanism 98 has at least one recess 102 in the closing element 28a or in its drive element 40a, and at least one recess 104 in the closing element 30a or in its drive element 42a. The locking elements 100 are arranged so as to be radially movable in the recesses 102 and 104 in the sleeve 94.

When the closing element 28a is lifted, the locking elements 100 engage in the recess 104 in the drive element 42a of the closing element 30a and are held therein in a radially non-movable fashion, as a result of which the sleeve 94, and therefore the flow barrier element 54a, is connected to the drive element 42a and therefore to the closing element 30a in such a way that the flow barrier element 54a cannot move axially towards the closing element 28a.

Figure 7:
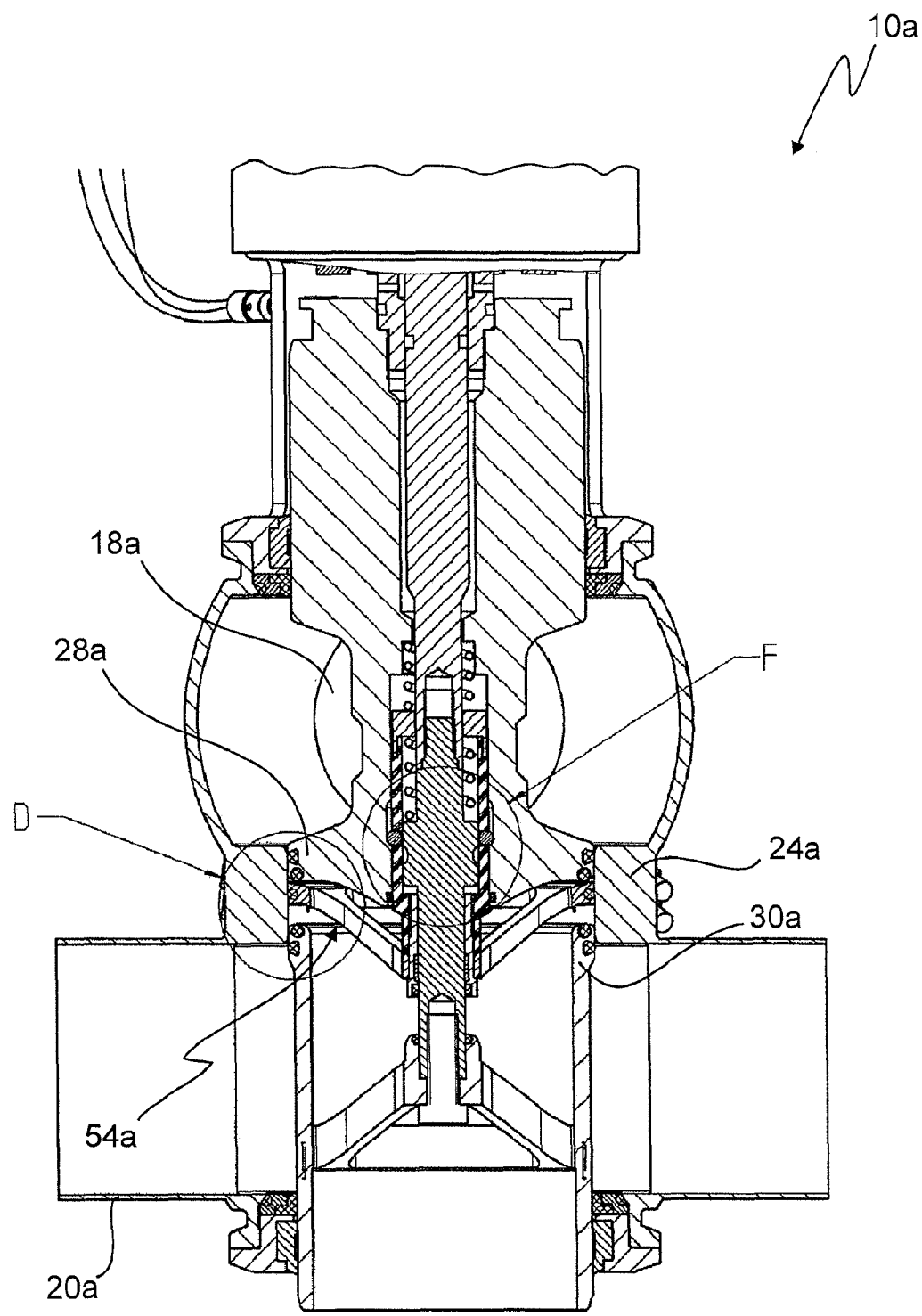
FIG. 7 shows the double seat valve in FIG. 4 in a fourth operating state.
Figure 7A:
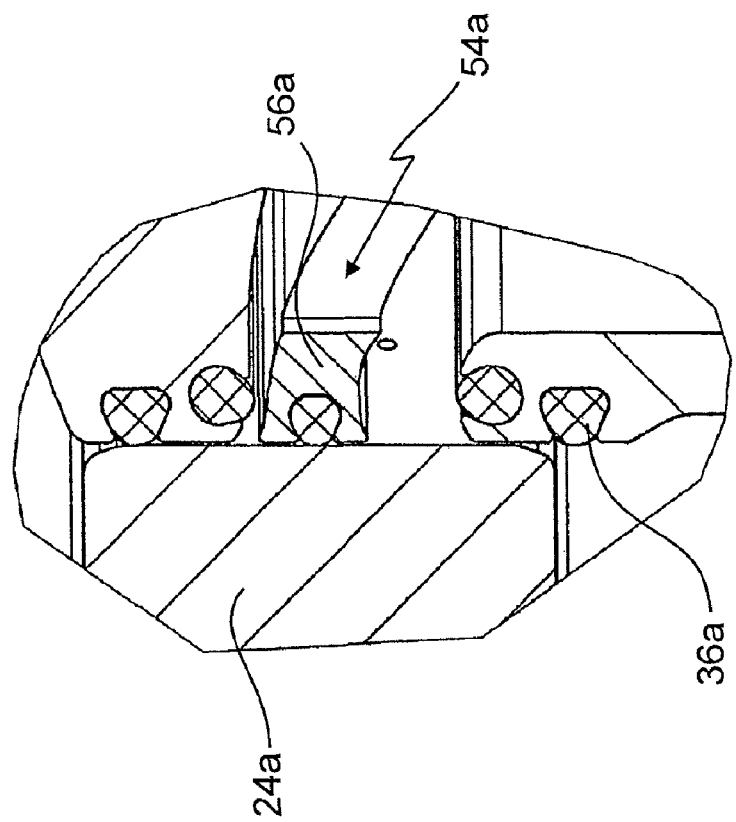
FIG. 7A shows a detail view of the double seat valve in the operating state according to FIG. 7.
Figure 7B:
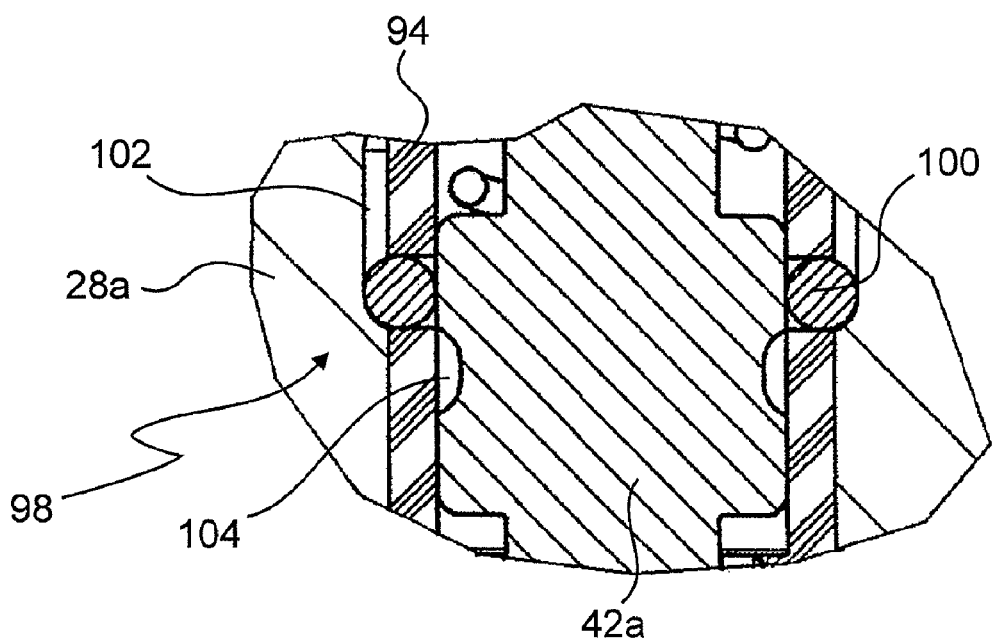
FIG. 7B shows a further detail view of the double seat valve in the operating state according to FIG. 7.

In the converse operating state according to FIG. 7, in which the closing element 30a is lifted, the locking mechanism 98 brings about a situation, as in FIG. 7B which shows the detail F in FIG. 7 on an enlarged scale, in which the flow barrier element 54a is connected to the closing element 28a and cannot move away from the latter in the direction of the closing element 30a. In this case, the locking elements 100 engage in the recess or recesses 102 in the drive element 40a and/or the closing element 28a and are held therein in a radially non-movable fashion.

The fact that while one closing element is lifted the flow barrier element 54a is connected to the other closing element which remains in its closed position has the advantage that the closing element seat of the closing element which is lifted is not concealed by the annular element 56a of the flow barrier element 54a, with the result that particularly good cleaning of the closing element seat of the closing element which is lifted is made possible.

FIG. 7A, which shows the detail D in FIG. 7 on an enlarged scale, makes it clear that the flow barrier element 54a is connected to the closing element 28a, while the closing element 30a is lifted from its closing element seat 38a.

In the operating states according to FIGS. 6 and 7 it is clear that owing to the floating mounting of the flow barrier element 54a, when the pressurized cleaning medium is applied to said flow barrier element 54a, the latter continues to be capable of moving axially towards the respective closing element to which it is locked, while only the axial mobility with respect to the closing element which is lifted is locked. This can be achieved by means of corresponding axial play of the locking elements 100 in the recesses 102 and 104, which play only permits movement in the direction of the closed closing element. As a result of the axial mobility of the flow barrier element 54a towards the respective closing element to which it is connected, the flow barrier element 54a, to be more precise its annular element 56a, can take up and attenuate the pressure of the injected cleaning medium.

FIGS. 8, 9, 10 and 11 illustrate further exemplary embodiments of a double seat valve 10b and 10c in the region of their closing elements 28b, 28c and 30b, 30c. The associated valve housings 12b and 12c are illustrated only in the region of the connecting section 24b and 24c.

The double seat valves 10b and 10c illustrate very simple refinements of the double seat valve according to the invention.

Again, identical reference signs have been used for identical or comparable parts or elements to those in the double seat valve 10, with the additional letter b or c.

Figure 8:
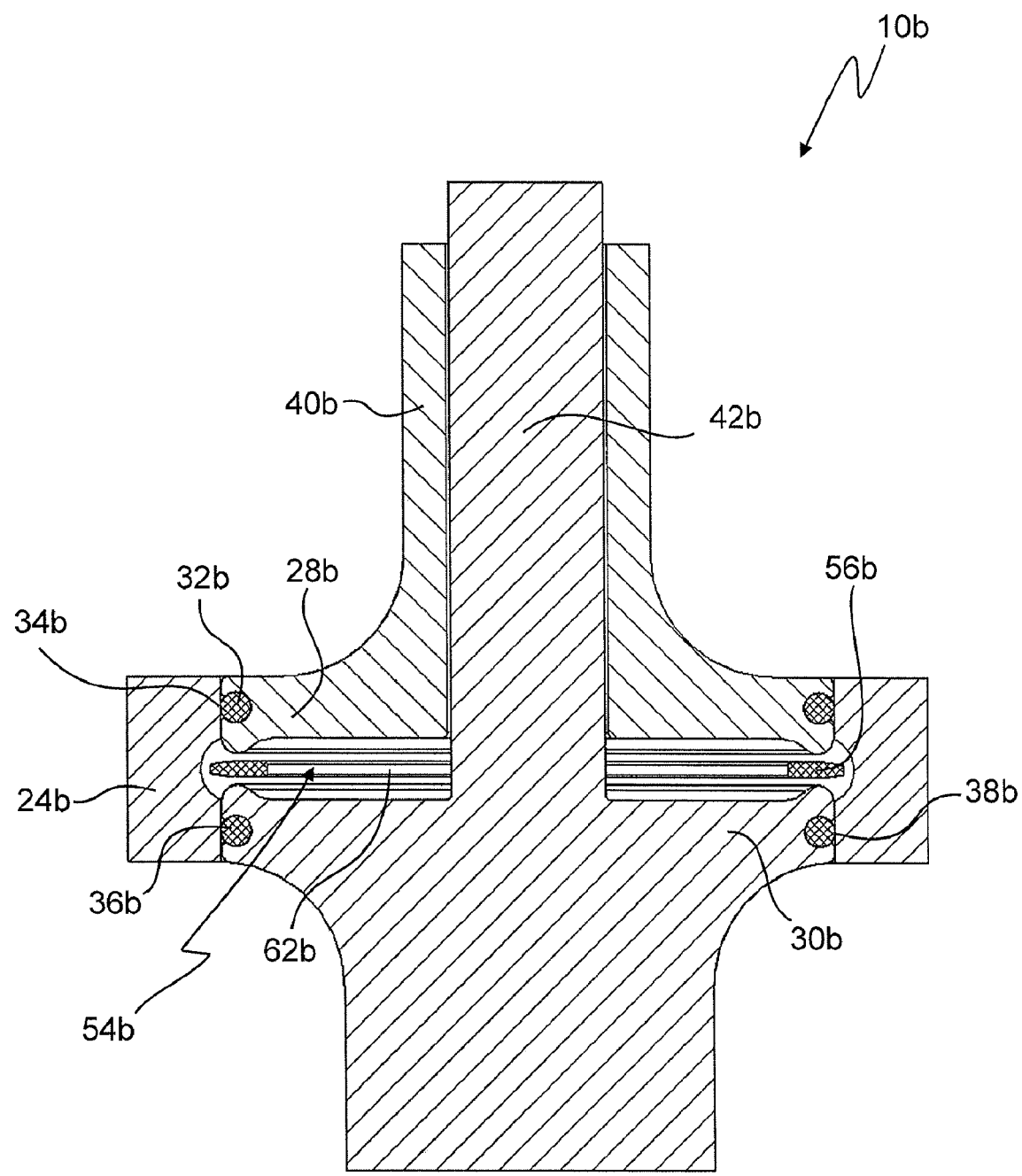
FIG. 8 shows yet another exemplary embodiment of a double seat valve (a detail thereof) in a first operating state and in longitudinal section.
Figure 9:
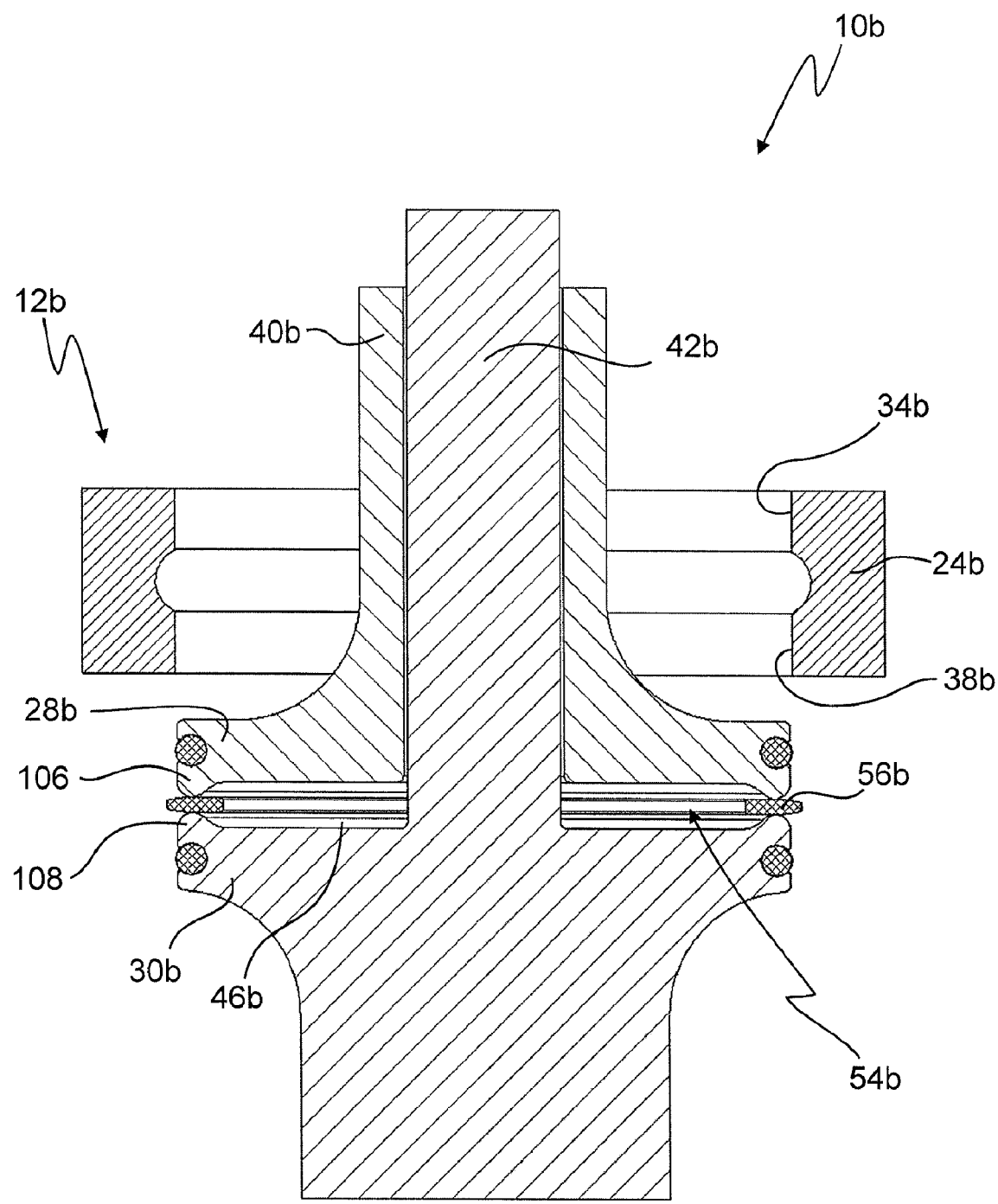
FIG. 9 shows the double seat valve in FIG. 8 in a second operating state.

In the case of the double seat valve 10b according to FIGS. 8 and 9, the flow barrier element 54b is merely formed by the annular element 56b which is arranged between the closing elements 28b and 30b. FIG. 8 shows the common closed position of the closing elements 28b and 30b. The flow barriers 54b are arranged loosely between the closing elements 28b and 30b, and they are also not guided axially on one of the drive elements 40b or 42b of the closing elements 28b and 30b, respectively.

In this particularly simple refinement, the radially inner region of the flow barrier element 54b is embodied completely as a drainage section 62b.

Neither closing element 28b nor closing element 30b when lifted moves the flow barrier element 54b axially.

However, owing to its loose or "flapping" arrangement between the two closing elements 28b and 30b, said flow barrier element 54b comes to bear against the closing element 30b owing to the pressure of the cleaning medium when, for example, the closing element 28b is lifted, and it prevents pressurized cleaning medium from being applied directly to the latter.

In the common open position of the closing elements 28b and 30b according to FIG. 9, the closing elements 28b and 30b are sealed with respect to the annular element 56b, which is made possible in the case of the embodiment of the annular element 56b from a plastic without additional axial sealing elements in the closing elements 28b and 30b.

It is sufficient for this that the closing elements 28b and 30b have axial projections 106 and 108, respectively, which are pressed against the annular element 56b of the flow barrier element 54b in the common open position of the closing elements 28b and 30b.

Figure 10:
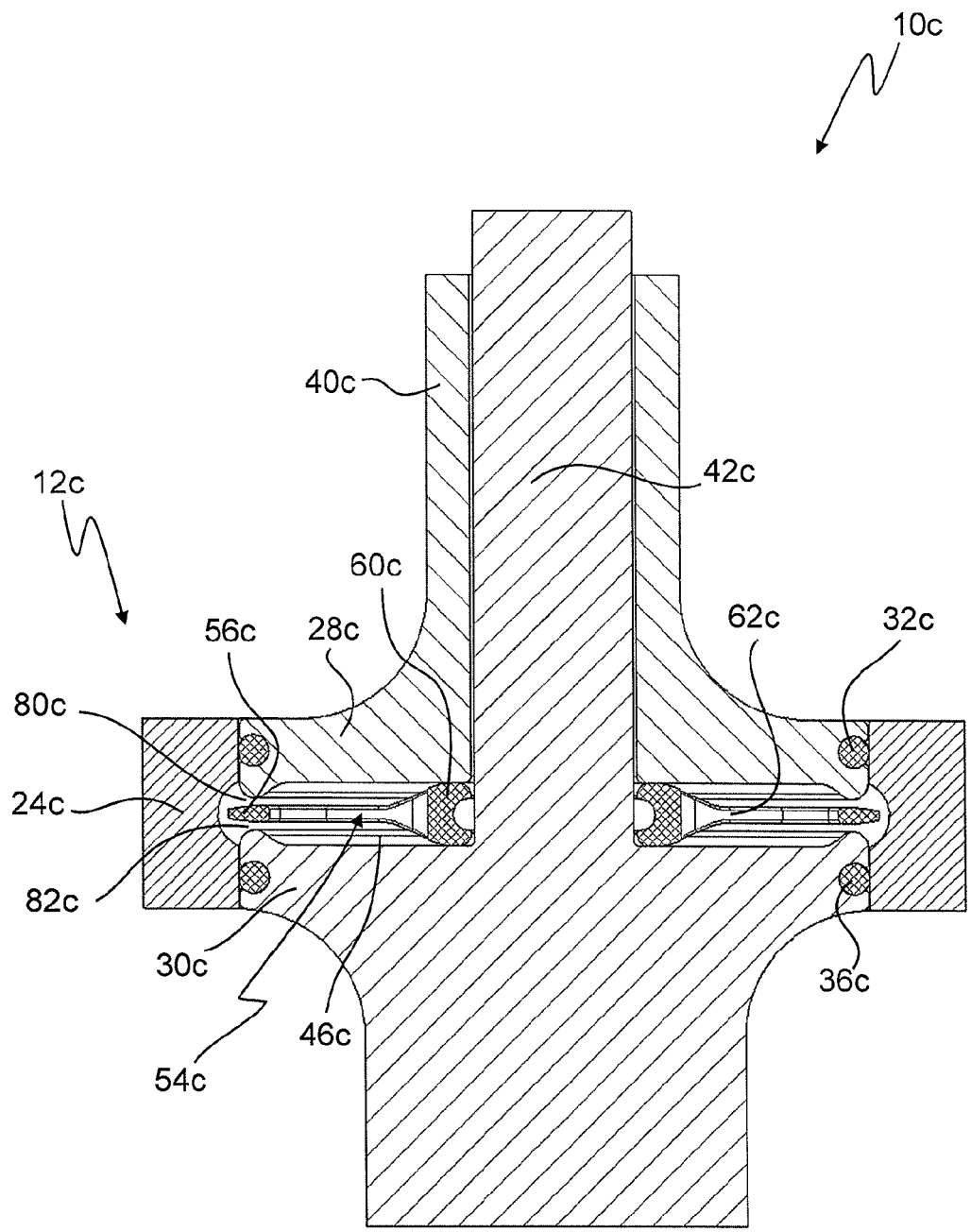
FIG. 10 shows yet another exemplary embodiment of a double seat valve (a detail thereof) in a first operating state and in longitudinal section.
Figure 11:
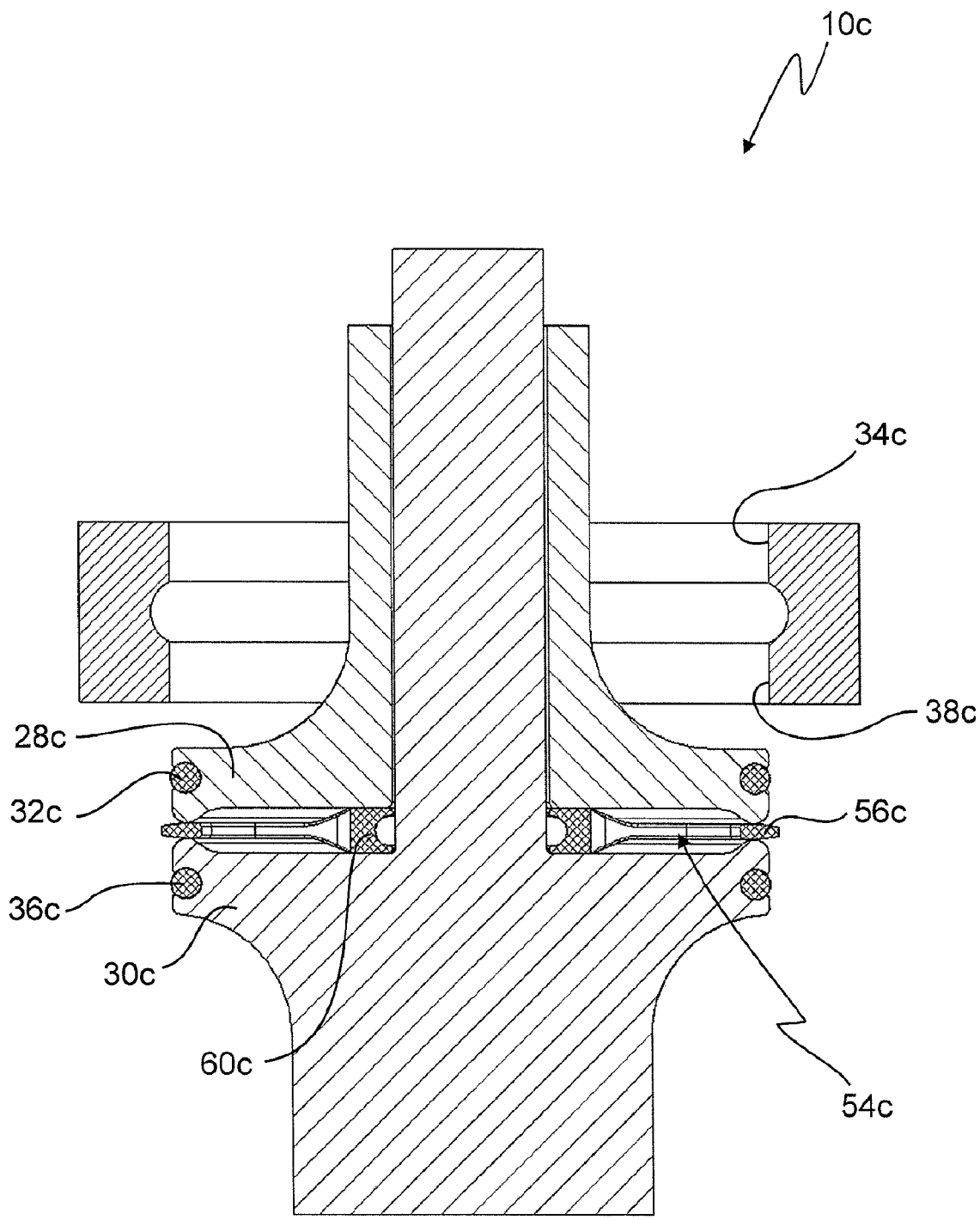
FIG. 11 shows the double seat valve in FIG. 10 in a second operating state.

The double seat valve 10c according to FIGS. 10 and 11 has a very similar configuration compared to the double seat valve 10b, with the flow barrier element 54c being also arranged loosely between the closing elements 28c and 30c, but being embodied, like the flow barrier element 54 or 54a, as a spoked wheel which has a plurality of spokes with openings lying between them, in order to form the drainage section 62c. The flow barrier element 54c has, radially on the inside, the connecting section 60c with which the flow barrier element 54c is mounted on the drive element 42c of the closing element 30c, without, however, being connected permanently to one of the two closing elements 28c and 30c, respectively.

In this embodiment, the flow barrier element 54c is also preferably constructed entirely or partially from plastic/elastomer or from a carrier material and elastomer, in which case the connecting section 60c is compressible so that in the common open position of the closing elements 28c and 30c the annular element 56c of the flow barrier element 54c can enter into axially seal-forming abutment with the closing elements 28c and 30c, as illustrated in FIG. 11.

FIGS. 12 to 15 illustrate yet another exemplary embodiment of a double seat valve which is provided with the general reference sign 10d. Such parts, elements and features which are the same as or comparable to those of the double seat valve according to FIG. 1 are provided with the same reference sign, with an additional letter d.

Unless described otherwise below, the same description as for the double seat valve 10 or the double seat valve 10a applies to the double seat valve 10d.

Similarly to the double seat valve 10a, the flow barrier element 54d is mounted in a floating fashion between the two closing elements 28d and 30d by means of two springs 110 and 112 which act in opposite directions.

Both the upper spring 110 and the lower spring 112 are embodied as compression springs.

The spring 110 is clamped in under tension in a spring housing 114, the spring housing 114 having an end side 116 against which a sleeve 118 is supported, said sleeve 118 being in turn supported against the drive element 40d of the closing element 28d. On the side opposite the end side 116, the spring housing 114 is supported on a radially inwardly directed projection on the drive element 40d of the closing element 28d. The spring housing 114 therefore compresses the spring 110 in order to obtain a certain degree of prestress of the spring 110.

The spring housing 114 is held in a non-movable fashion in relation to the closing element 28d or its drive element 40d.

The lower spring 112 is also enclosed under prestress. The spring 112 is arranged in a spring housing 122 which is formed by a sleeve 124, which is connected to the flow barrier element 54d, and a closure 126. The closure 126 is permanently connected to the sleeve 124. Opposite the closure 126, the spring 112 is supported on a disc 127.

Figure 12:
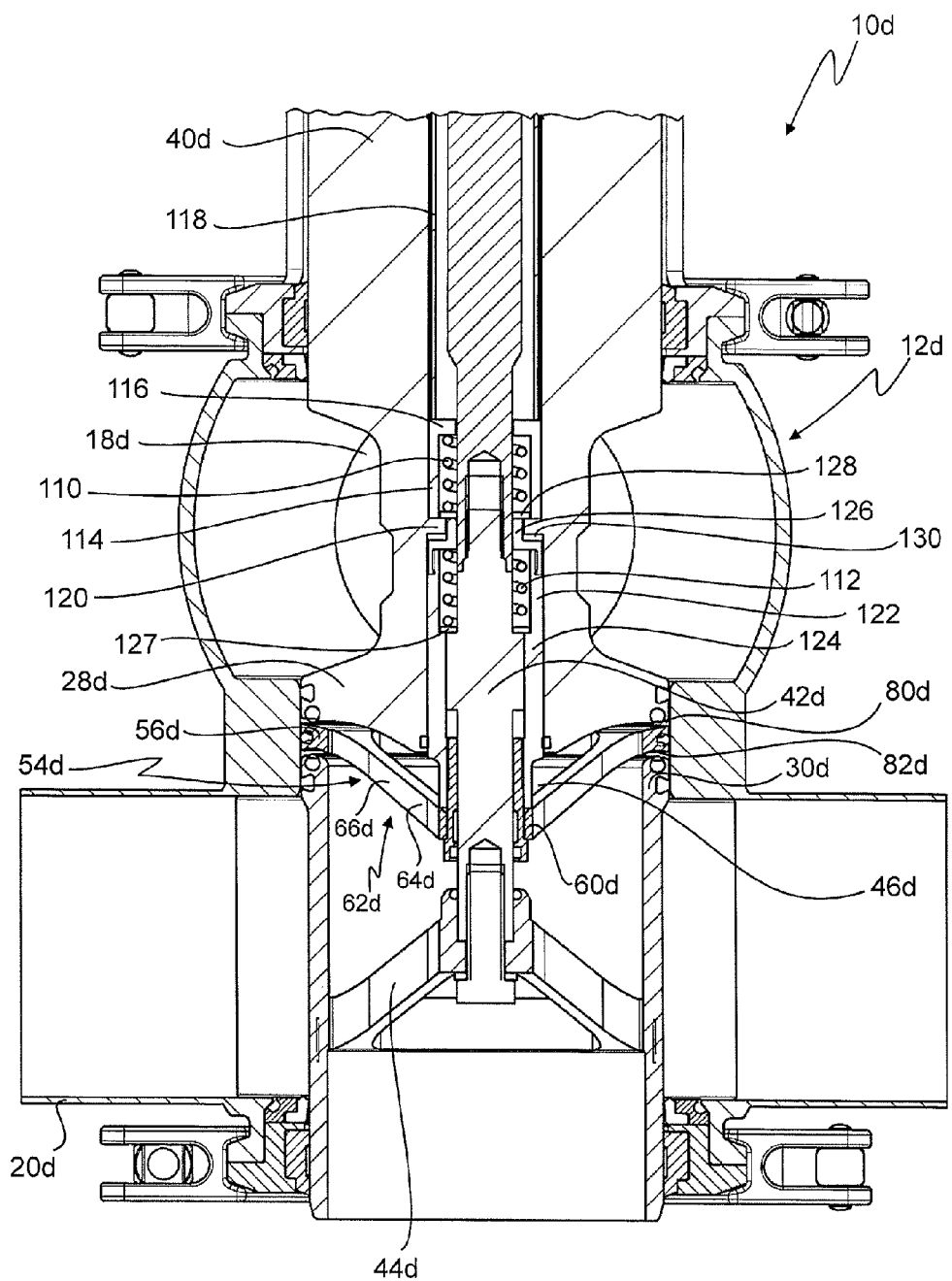
FIG. 12 shows yet another exemplary embodiment of a double seat valve (a detail thereof) in a first operating state and in longitudinal section.

Between the radial projection 120 on the drive element 40d of the closing element 28d and the closure 126, there is a gap 130 in the common closed position of the closing elements 28d and 30d which is shown in FIG. 12.

Figure 13:
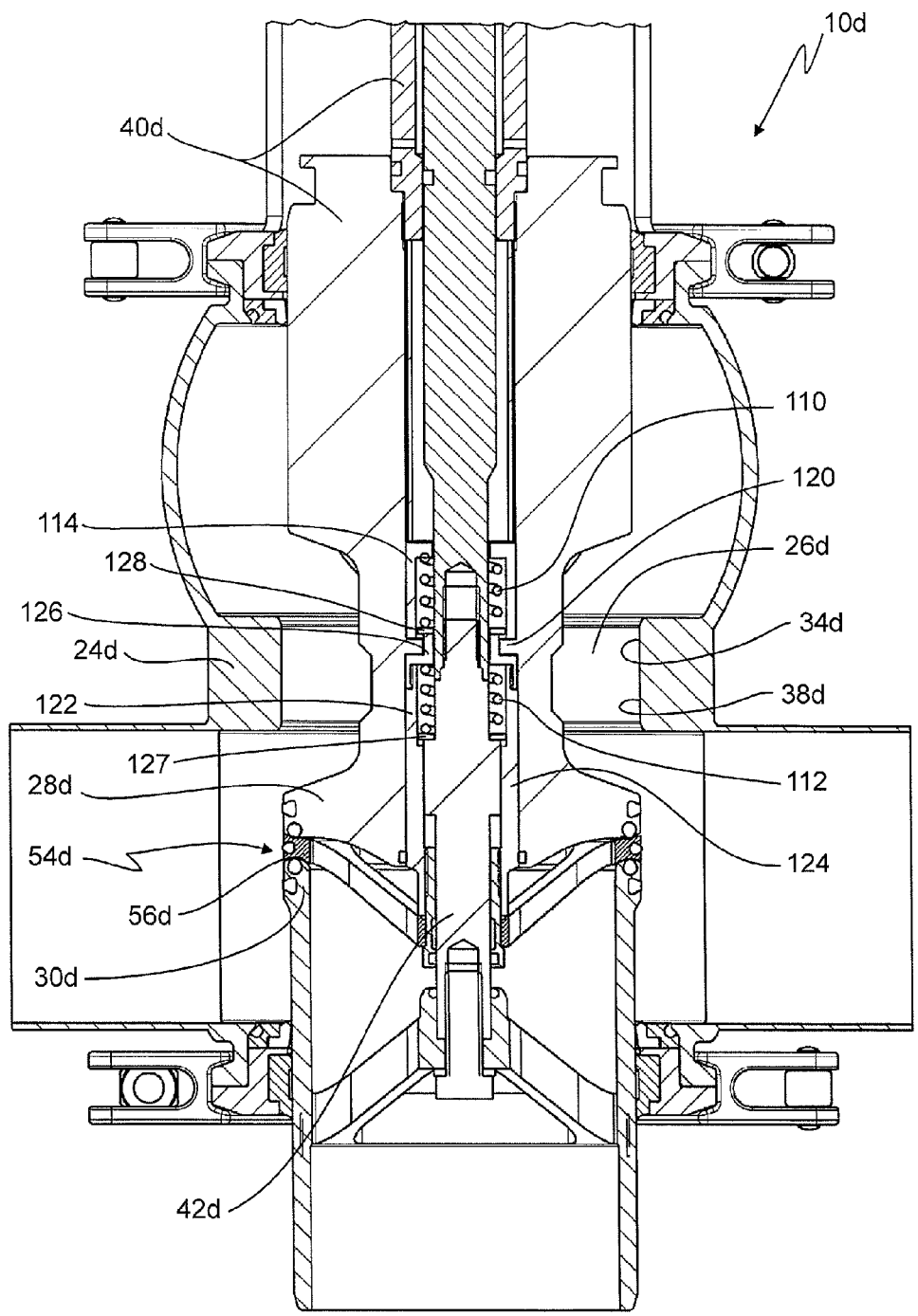
FIG. 13 shows the double seat valve in FIG. 12 in a second operating state.

FIG. 13 illustrates the operating state of the double seat valve 10d in which the two closing elements 28d and 30d are moved into their open position, in which case the flow barrier element 54d is held in a sandwich arrangement between the two closing elements 28d and 30d and is sealed with respect to these two closing elements 28d and 30d.

In order to move the two closing elements 28d and 30d and entrain the flow barrier element 54d into the common open position, the drive element 40d of the closing element 28d is firstly moved downward, in which case the gap 130 is closed by means of a relative movement between the drive element 40d and the sleeve 124 according to FIG. 12. As a result, the closing element 28d is moved against the annular element 56d of the flow barrier element 54d. The upper spring 110 is compressed somewhat further here by virtue of the fact that the disc 128, which is axially movable in relation to the spring housing 114, is pressed upwards by the closure 126.

Through further axial movement of the drive element 40d in the downward direction, the radial projection 120 presses the sleeve 124 downwards, and since the sleeve 124 can move in relation to the drive element 42d of the closing element 30d, the lower spring 112 is also compressed somewhat further than in its position in FIG. 12.

The annular element 56d is moved here against the closing element 30d, and through further movement of the drive element 40d in the downward direction the entire arrangement composed of the closing element 28d, flow barrier element 54d and closing element 30d is moved into the open position shown in FIG. 13.

Figure 14:
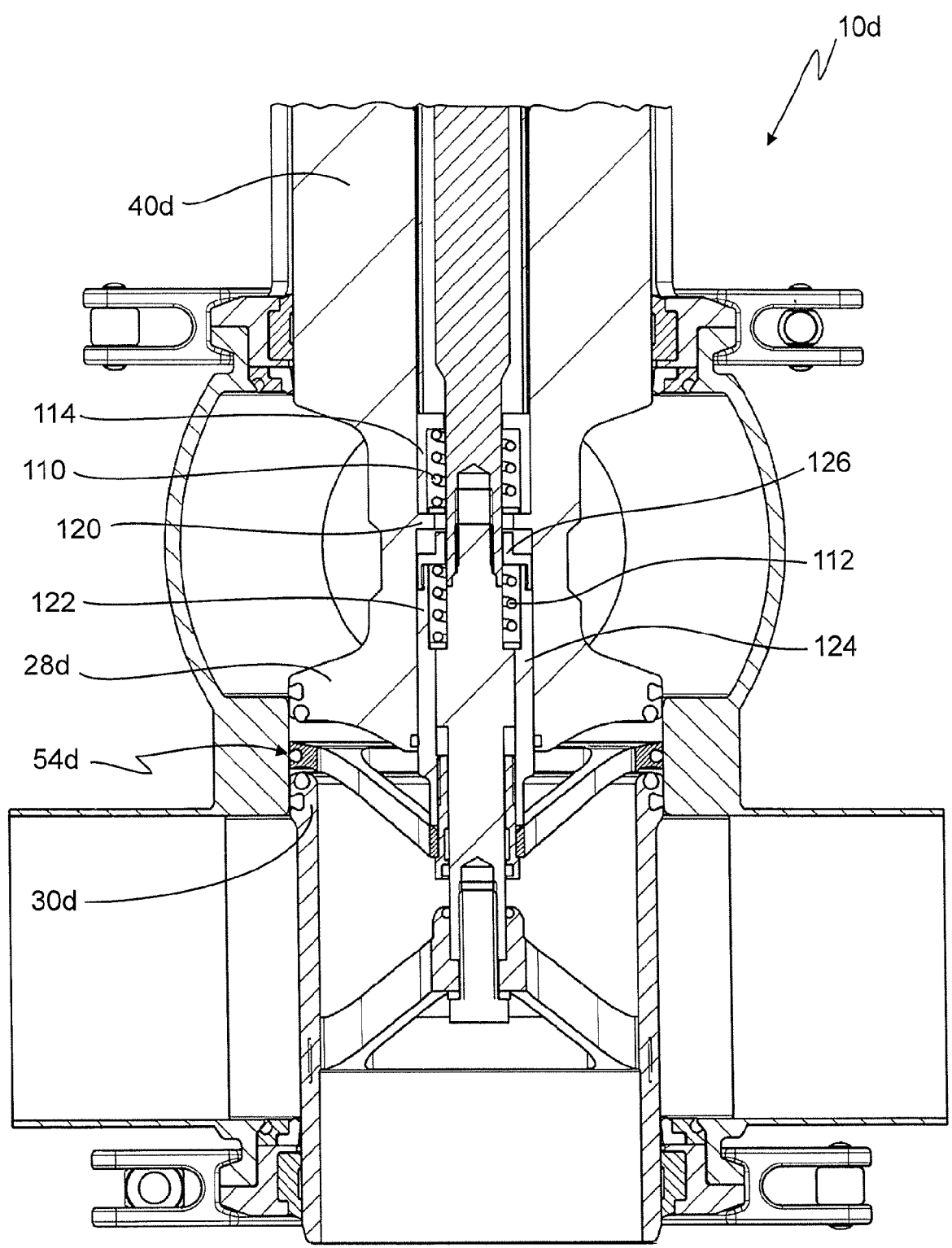
FIG. 14 shows the double seat valve in FIG. 12 in a third operating state.

FIG. 14 shows the operating state of the double seat valve 12d in which the closing element 28d is lifted from its closing element seat 34d, while the closing element 30d continues to be in abutment in a seal-forming fashion with its closing element seat 38d.

When the closing element 28d is lifted, its drive element 40d is moved upwards. The spring 110 remains here in the state as in the common closed position of the two closing elements 28d and 30d according to FIG. 12. This is due to the fact that the radially inner projection 120 moves along the spring housing 114 and the disc 128 upwards. In the process, the drive element 40d also moves relative to the closure 126 which is permanently connected to the sleeve 124. Since the drive element 40d can move axially in relation to the sleeve 124, the sleeve 124, and therefore the flow barrier element 54d, remain in their position according to FIG. 12 when the closing element 28d is lifted, as is apparent from FIG. 14.

Figure 15:
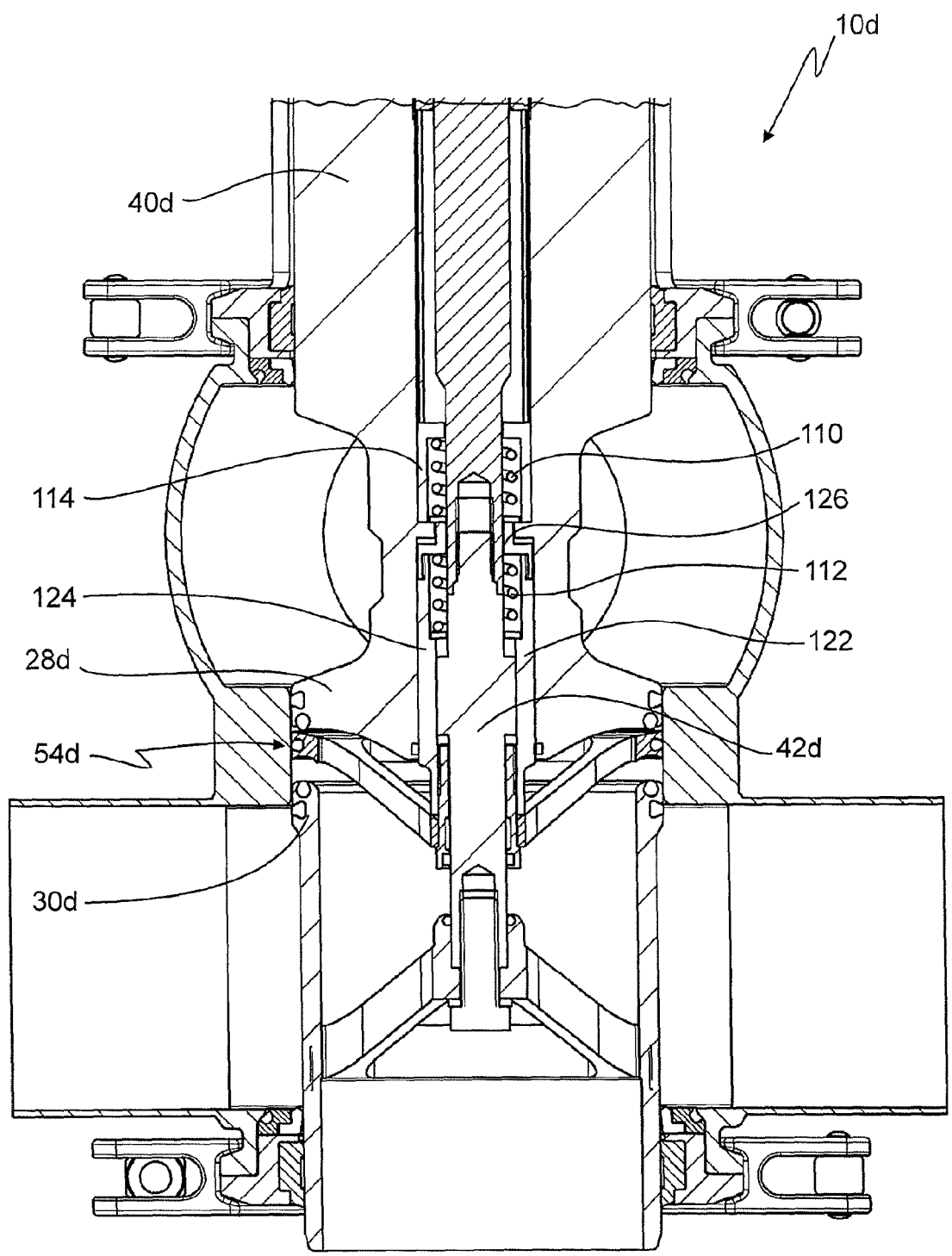
FIG. 15 shows the double seat valve in FIG. 12 in a fourth operating state.

FIG. 15 shows the converse operating state to that in FIG. 14, the closing element 30d being lifted from its closing element seat 38d here while the closing element 28d continues to be in seal-forming abutment with its closing element seat 34d.

In order to lift the closing element 30d, its drive element 42d is moved downwards. Since the drive element 42d can move axially in relation to the sleeve 124 to which the flow barrier element 54d is connected, and owing to the enclosure of spring 112, which retains its compressed state as in FIG. 12, the flow barrier element 54d also remains in its position according to FIG. 12 when the closing element 30d is lifted, as is apparent from FIG. 15. Therefore, essentially the same effect as with the double seat valve 10a is achieved, specifically when one of the closing elements 28d, 30d is lifted the flow barrier element remains essentially in its home position and is not moved along with said closing element 28d or 30d, without the need for the flow barrier element 54d to be locked to the closing elements in order to ensure this.

The invention claimed is:

1. A double seat valve for separating media, comprising:
   a valve housing having connectors for a first pipeline and a second pipeline;
   a first closing element and a first closing element seat, said first closing element being in seal-forming abutment, in a closed position of said first closing element, with said first closing element seat via at least one first sealing element;
   a second closing element spaced apart axially from said first closing element and a second closing element seat, said second closing element being, in a closed position of said second closing element, in seal-forming abutment with said second closing element seat via at least one second sealing element;
   wherein said first and second closing elements can be lifted independently of one another from said respective first and second closing element seats;
   a leakage space being provided between said first and second closing elements;
   a flow barrier element arranged between said first and second closing elements;
   wherein said flow barrier element shadows at least one of said at least one first sealing element and said first closing element seat of said first closing element which is in said closed position, when said second closing element is lifted and when cleaning medium is applied to said leakage space, said flow barrier element preventing said cleaning medium which enters said leakage space from flowing directly against said at least one of said first sealing element and said first closing element seat of said first closing element; and wherein said flow barrier element shadows at least one of said at least one second sealing element and said second closing element seat of said second closing element which is in said closed position, when said first closing element is lifted and when cleaning medium is applied to said leakage space, said flow barrier element preventing said cleaning medium which enters said leakage space from flowing directly against said at least one of said second sealing element and said second closing element seat of said second closing element.

2. The double seat valve of claim 1, wherein said flow barrier element bears radially on said housing between said first and second closing element seats at least when said first closing element is lifted from said first closing element seat or when said second closing element is lifted from said second closing element seat.

3. The double seat valve of claim 1, wherein said flow barrier element is spaced apart from said housing by a small gap.

4. The double seat valve of claim 1, wherein said flow barrier element can be moved axially.

5. The double seat valve of claim 2, wherein said flow barrier element has, radially on an outside of said flow barrier element, a sliding element which bears against said housing.

6. The double seat valve of claim 2, wherein said flow barrier element is composed of a slidable material radially on an outside of said flow barrier element.

7. The double seat valve of claim 1, wherein, in a common open position of said first and second closing elements, said flow barrier element forms a seal axially against said first and second closing elements.

8. The double seat valve of claim 1, wherein, in said closed position of said first and second closing elements, said flow barrier element is spaced apart axially from said first and second closing elements by a gap.

9. The double seat valve of claim 1, wherein said flow barrier element has, on at least a side facing one of said first and second closing elements, a contour which brings about an at least partial deflection of flow of said cleaning medium from an axial direction into an essentially radial direction.

10. The double seat valve of claim 1, wherein said flow barrier element is guided axially on a drive element of one of said first and second closing elements.

11. The double seat valve of claim 1, wherein said flow barrier element is embodied as a ring.

12. The double seat valve of claim 1, wherein said flow barrier element is arranged loosely between said first and second closing elements.

13. The double seat valve of claim 1, wherein said flow barrier element is attached to one of said first and second closing elements with relative axially limited play, wherein at least one spring, whose effect on said flow barrier element is directed away from said one of said first and second closing elements, is arranged between said one of said first and second closing element and said flow barrier element.

14. The double seat valve of claim 1, wherein said flow barrier element is mounted in a floating fashion between said first and second closing elements by means of at least two springs which act in opposite directions.

15. The double seat valve of claim 1, wherein a locking mechanism is provided, which, when one of said first and second closing elements is lifted, locks said flow barrier element to the other of said first and second closing elements.

16. The double seat valve of claim 15, wherein, in a position in which said flow barrier element is locked to a respective one of said first and second closing elements, can move axially with respect to said respective one of said first and second closing elements when pressure is applied.

17. The double seat valve of claim 15, wherein said flow barrier element has a sleeve which is arranged radially between a first drive element of said first closing element and a second drive element of said second closing element and can move axially in relation to said first and second drive elements, wherein said locking mechanism has at least one locking element which is connected to said sleeve and which is held in such a way that said locking element engages alternately in recesses in said first or second drive elements in order to lock said sleeve to said respective one of said first and second closing elements.

18. The double seat valve of claim 1, wherein said flow barrier element has a drainage section whose overall passage cross section is at least as large as an opening cross section of a larger one of said connectors.

19. The double seat valve of claim 18, wherein said drainage section has a plurality of spokes which are directed obliquely with respect to a radial direction.

20. The double seat valve of claim 1, wherein said flow barrier element is embodied as a spoked wheel.

* * * * *